(12) United States Patent
Yang et al.

(10) Patent No.: US 11,929,081 B2
(45) Date of Patent: Mar. 12, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Hejung Yang, Suwon-si (KR); Hyungjun Lim, Suwon-si (KR); Jaeyoung Roh, Suwon-si (KR); Yeaseul Song, Suwon-si (KR); Hojun Jin, Suwon-si (KR); Jubum Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 17/424,412

(22) PCT Filed: Jun. 22, 2021

(86) PCT No.: PCT/KR2021/007819
§ 371 (c)(1),
(2) Date: Jul. 20, 2021

(87) PCT Pub. No.: WO2022/169039
PCT Pub. Date: Aug. 11, 2022

(65) Prior Publication Data
US 2023/0154470 A1 May 18, 2023

(30) Foreign Application Priority Data
Feb. 2, 2021 (KR) .......................... 10-2021-0014988

(51) Int. Cl.
*G10L 17/24* (2013.01)
*G06F 3/04847* (2022.01)
(Continued)

(52) U.S. Cl.
CPC .......... *G10L 17/24* (2013.01); *G06F 3/04847* (2013.01); *G06F 3/167* (2013.01); *G06F 40/279* (2020.01); *G10L 17/14* (2013.01)

(58) Field of Classification Search
CPC ....... G10L 17/24; G10L 17/14; G06F 40/279; G06F 3/167; G06F 3/04847
(Continued)

(56) References Cited

U.S. PATENT DOCUMENTS 9,240,182 B2    1/2016  Lee et al.
9,892,729 B2    2/2018  Yun et al.
(Continued)

FOREIGN PATENT DOCUMENTS

JP    2009092975 A    4/2009
JP    2016099501 A    5/2016
(Continued)

OTHER PUBLICATIONS

International Search Report (PCT/ISA/210) dated Oct. 22, 2021 by the International Searching Authority in counterpart International Patent Application No. PCT/KR2021/007819.
(Continued)

*Primary Examiner* — Susan I McFadden
(74) *Attorney, Agent, or Firm* — Sughrue Mion, PLLC

(57) ABSTRACT

An electronic apparatus is provided. The electronic apparatus may include a microphone; a memory configured to store a wakeup word; and a processor configured to: identify, based on context information of the electronic apparatus, an occurrence of a pre-determined event; change, based on the occurrence of the pre-determined event, a first threshold value for recognizing the wakeup word; obtain, based on a first user voice input received via the microphone, a similarity value between first text information corresponding to the first user voice input and the wakeup word; and perform,
(Continued)

based on the similarity value being greater than or equal to the first threshold value, a voice recognition function on second text information corresponding to a second user voice input received via the microphone after the first user voice input.

10 Claims, 20 Drawing Sheets

(51) Int. Cl.
  *G06F 3/16* (2006.01)
  *G06F 40/279* (2020.01)
  *G10L 17/14* (2013.01)
(58) Field of Classification Search
  USPC .......................................................... 704/235
  See application file for complete search history.

(56) References Cited

U.S. PATENT DOCUMENTS

| | | | |
|---|---|---|---|
| 9,953,632 B2 | 4/2018 | Yun et al. | |
| 9,972,323 B2 | 5/2018 | Foerster et al. | |
| 10,418,027 B2* | 9/2019 | Ko | G10L 15/04 |
| 10,567,515 B1* | 2/2020 | Bao | G10L 17/22 |
| 10,715,604 B1* | 7/2020 | Bao | G10L 15/22 |
| 10,838,954 B1* | 11/2020 | Santos | G10L 15/22 |
| 10,978,058 B2 | 4/2021 | Yoo et al. | |
| 11,012,575 B1* | 5/2021 | Leblang | G06Q 10/109 |
| 11,044,321 B2* | 6/2021 | Bao | G06F 3/167 |
| 11,627,189 B2* | 4/2023 | Bao | H04L 67/306 |
| | | | 704/275 |
| 11,687,526 B1* | 6/2023 | Santos | G10L 15/1815 |
| | | | 704/254 |
| 2014/0334645 A1 | 11/2014 | Yun et al. | |
| 2015/0081296 A1 | 3/2015 | Lee et al. | |
| 2018/0210702 A1 | 7/2018 | Shim et al. | |
| 2019/0172451 A1 | 6/2019 | Yoo et al. | |

FOREIGN PATENT DOCUMENTS

| | | |
|---|---|---|
| JP | 2019-191490 A | 10/2019 |
| KR | 10-2015-0027592 A | 3/2015 |
| KR | 10-2016-0005045 A | 1/2016 |
| KR | 10-2016-0055915 A | 5/2016 |
| KR | 10-2019-0065861 A | 6/2019 |
| KR | 102158210 B1 | 9/2020 |

OTHER PUBLICATIONS

Written Opinion (PCT/ISA/237) dated Oct. 22, 2021 by the International Searching Authority in counterpart International Patent Application No. PCT/KR2021/007819.

* cited by examiner

| EVENT TYPE | EVENT SUBJECT | EVENT CONFIDENCE VALUE CONDITION | CHANGE WAKEUP WORD THRESHOLD VALUE |
|---|---|---|---|
| LOCATION | THEATER | >=0.6 | INCREASE |
| LOCATION | HOME | >=0.8 | DECREASE |
| LOCATION | MEETING ROOM | >=0.6 | INCREASE |
| TIME | 2021-01-15 15:30 ~ 2021-01-15 17:30 | 1 | INCREASE |
| TIME | DAILY 00:00 ~ DAILY 08:00 | 1 | INCREASE |
| OPERATION | WATCHING MOVIE | >=0.6 | INCREASE |
| OPERATION | ON THE PHONE | >=0.6 | INCREASE |

FIG. 17

| NUMBER | DATE | NAME | LOCATION |
|---|---|---|---|
| #01 | 2021-01-20, 19:00~21:00 | WATCHING MOVIE | SEOUL GANGNAM STATION |
| #02 | 2021-01-22, 20:00~21:00 | MEETING FRIEND | SEOUL GANGNAM STATION |
| #03 | 2021-01-24, 15:00~16:00 | WORK MEETING | COMPANY |

1705

_US 11,929,081 B2_

ELECTRONIC APPARATUS AND CONTROLLING METHOD THEREOF

TECHNICAL FIELD

The disclosure relates to an electronic apparatus and a control method thereof. More particularly, the disclosure relates to an electronic apparatus which performs a voice recognition function by recognizing a wakeup word and a control method thereof.

CROSS-REFERENCE TO RELATED APPLICATION(S)

This application claims benefit of priority to Korean Patent Application No. 10-2021-0014988, filed on Feb. 2, 2021, in the Korean Intellectual Property Office, the disclosure of which is incorporated by reference herein in its entirety.

BACKGROUND ART

In order to perform a voice recognition function, an action of uttering a wakeup word may be required. When the wakeup word is recognized, an electronic apparatus may be configured to perform a voice recognition operation with respect to a following dialog.

For example, it may be assumed that "hi Bixby" is a wakeup word. Based on a user voice of "hi, Bixby, turn on music" being received, the electronic apparatus may be configured to identify the "hi, Bixby" part as the wakeup word, and perform a voice recognition function which corresponds to "turn on music."

Meanwhile, there may be difficulty in identifying the user intent in a situation in which the wakeup word is recognized. Specifically, there may be situations of the user not having uttered the wakeup word directly, or not uttering the wakeup word in order to use the voice recognition function of the electronic apparatus.

There may be situations where the voice recognition function is not to be activated. For example, the user may not desire the voice recognition function in situations where the user is viewing a movie with multiple people or participating in a meeting. In situations such as a character in a movie uttering the wakeup word in theaters or the like or the wakeup word being uttered unintentionally during a meeting, there may be the problem of the electronic apparatus recognizing the wakeup word.

Setting the voice recognition function to be inactivated in specific situations may also be an inconvenient act from the user position. In addition, if the voice recognition function is immediately inactivated automatically in specific situations, there may be the problem of not being able to use the voice recognition function in exceptional specific situations. Exceptionally, in a situation where the wakeup word is uttered during the meeting to activate the voice recognition function, the user may undergo the inconvenience of having to manually change the setting again.

DISCLOSURE

Technical Problem

Aspects of the disclosure are to address at least the above-mentioned problems and/or disadvantages and to provide at least the advantages described below. Accordingly, an aspect of the disclosure is to provide an electronic apparatus which changes a wakeup word recognition accuracy by changing a reference value required in recognizing a wakeup word based on collected context information and a controlling method thereof.

According to an aspect of an example embodiment, an electronic apparatus may include a microphone; a memory configured to store a wakeup word; and a processor configured to: identify, based on context information of the electronic apparatus, an occurrence of a pre-determined event; change, based on the occurrence of the pre-determined event, a first threshold value for recognizing the wakeup word; obtain, based on a first user voice input received via the microphone, a similarity value between first text information corresponding to the first user voice input and the wakeup word; and perform, based on the similarity value being greater than or equal to the first threshold value, a voice recognition function on second text information corresponding to a second user voice input received via the microphone after the first user voice input.

The context information may include at least one from among schedule information, application execution information, time information, location information, speed information, acceleration information, audio information, or motion information.

The processor may identify that the time information matches pre-determined time information corresponding to the pre-determined event; identify that the location information matches pre-determined location information corresponding to the pre-determined event; and identify the occurrence of the pre-determined event based on identifying that the time information matches the pre-determined time information and that the location information matches the pre-determined location information.

The processor may store, based on a pre-determined key-word being included in the schedule information, the schedule information as the pre-determined event; and identify, based on the time information matching pre-determined time information corresponding to the schedule information, the occurrence of the pre-determined event.

The processor may identify a number of speakers uttering voice inputs based on the audio information; and identify, based on the number of speakers being greater than or equal to a second threshold value, the occurrence of the pre-determined event.

The first threshold value may be a value used to determine whether the wakeup word is recognized.

The electronic apparatus may include a sensor; a camera; and a communication interface. The processor may obtain at least one of the speed information or the acceleration information based on sensing data obtained via the sensor; obtain the audio information based on a third user voice obtained via the microphone; obtain the motion information based on an image obtained via the camera; and receive the time information or the location information from an external server via the communication interface.

The electronic apparatus may include a display. The processor may control, based on the occurrence of the pre-determined event, the display to display a user interface (UI) to change the first threshold value; and change, based on a user input for changing the first threshold value being received via the UI, the first threshold value based on the user input.

The processor may delete, based on another user input for maintaining the first threshold value being received via the UI, the pre-determined event.

The processor may obtain an event confidence value corresponding to the pre-determined event based on the context information; and change, based on the event confidence value being greater than or equal to a third threshold value, the first threshold value.

According to an aspect of an example embodiment, a method of controlling an electronic apparatus configured to store a wakeup word may include identifying, based on context information of the electronic apparatus, an occurrence of a pre-determined event; changing, based on the occurrence of the pre-determined event, a first threshold value for recognizing the wakeup word; obtaining, based on receiving a first user voice input, a similarity value between first text information corresponding to the first user voice input and the wakeup word; and performing, based on the similarity value being greater than or equal to the first threshold value, a voice recognition function on second text information corresponding to a second user voice input received after the first user voice input.

The context information comprises at least one from among schedule information, application execution information, time information, location information, speed information, acceleration information, audio information, or motion information.

The changing the first threshold value comprises, identifying that the time information matches pre-determined time information corresponding to the pre-determined event, identifying that the location information matches pre-determined location information corresponding to the pre-determined event, and identifying the occurrence of the pre-determined event based on identifying that the time information matches the pre-determined time information and that the location information matches the pre-determined location information.

The method further comprising storing, based on a pre-determined event key-word being included in the schedule information, the schedule information as the pre-determined event and identifying, based on the time information matching pre-determined time information corresponding to the schedule information, the occurrence of the pre-determined event.

The method further comprising identifying a number of speakers uttering voice inputs based on the audio information and identifying, based on the number of speakers being greater than or equal to a second threshold value, the occurrence of the pre-determined event.

DESCRIPTION OF DRAWINGS

The above and other aspects, features, and advantages of certain embodiments of the present disclosure will be more apparent from the following description taken in conjunction with the accompanying drawings, in which:

FIG. 14 is a diagram illustrating event information;

FIG. 17 is a diagram illustrating an operation of an electronic apparatus storing some schedules from among a plurality of schedules as a pre-determined event;

MODE FOR INVENTION

Figure 1:
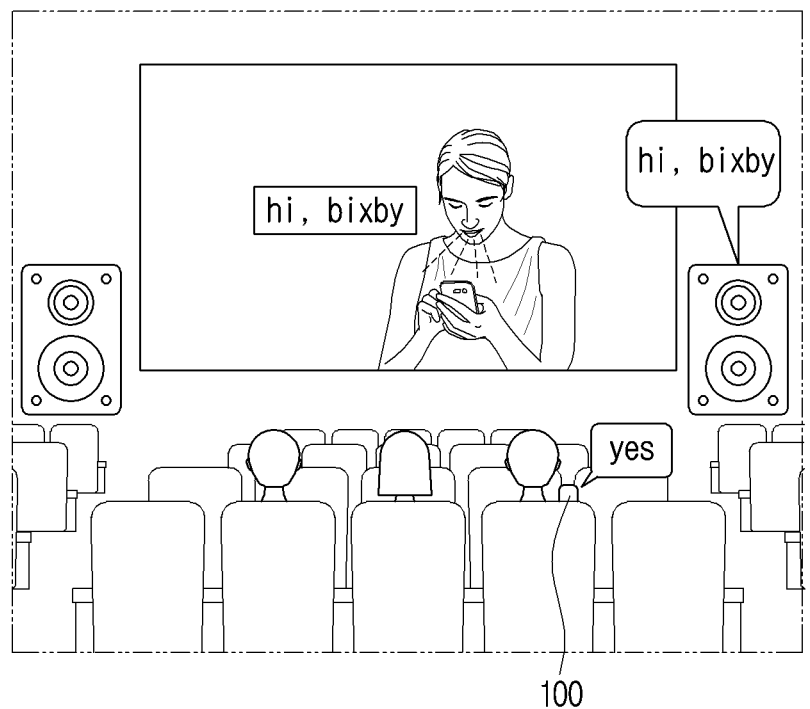
FIG. 1 is a diagram illustrating an example of an electronic apparatus recognizing a wakeup word.

The disclosure will be explained in detail below with reference to the attached drawings.

The terms used in the embodiments of the disclosure are general terms that are currently widely used and identified in consideration of the functions in the disclosure. However, these terms may vary depending on intention, legal or technical interpretation, emergence of new technologies, and the like, of those skilled in the related art. Also, there may be some terms arbitrarily identified by an applicant, and in this case the meaning thereof will be described in detail in the description part of the corresponding disclosure. Accordingly, the terms used herein may be understood, not simply by their designations, but based on the meaning of the term and the overall content of the disclosure.

In the disclosure, expressions such as "comprise," "may comprise," "include," "may include," or the like, are used to designate a presence of a corresponding characteristic (e.g., elements such as numerical value, function, operation, or component, etc.), and not to preclude a presence or a possibility of additional characteristics.

The expression at least one of A and/or B is to be understood as indicating any one of "A," "B," or "A and B."

Expressions such as "first", "second", "1st," "2nd," etc., used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the other element, or as being coupled through another element (e.g., third element).

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms "module" or "part" used in the embodiments herein perform at least one function or operation, and may be implemented as a hardware or software, or by a combination of the hardware and software. Further, a plurality of "modules" or a plurality of "parts", except for a "module" or a "part" which needs to be implemented to a specific hardware, may be integrated to at least one module and implemented in at least one processor (not shown).

In this disclosure, the term "user" may refer to a person using an electronic apparatus or an apparatus (e.g., artificial intelligence electronic apparatus) using an electronic apparatus.

The embodiments of the disclosure will be described in greater detail below with reference to the accompanied drawings.

FIG. 1 is a diagram illustrating an example of an electronic apparatus recognizing a wakeup word.

Referring to FIG. 1, a wakeup word of an electronic apparatus 100 may be "hi Bixby." Here, a plurality of electronic apparatuses manufactured from a same company may include the same wakeup words. Accordingly, the wakeup word of the plurality of electronic apparatuses may be "hi, Bixby."

Here, a user of the electronic apparatus 100 of which the wakeup word is "hi, Bixby" may be watching a movie in a theater. When a voice saying "hi, Bixby" is voiced from a line in the movie, the electronic apparatus 100 may recognize it as the wakeup word.

Accordingly, despite it not being intended by the user of the electronic apparatus 100, there may be the problem of recognizing lines from the movie as the wakeup word.

Specifically, the electronic apparatus 100 may output, based on the wakeup word being recognized, a separate response through a speaker. For example, the electronic apparatus 100 may output, based on the wakeup word being recognized, an audio data of "yes." In the above-described example, the electronic apparatus 100 may output the audio data of "yes" based on lines from the movie in the theater despite it not being intended by the user. Accordingly, there may be the problem of causing inconvenience to other people in the theater.

According to an embodiment, the wakeup word may be changed according to a user setting or a manufacturing company of the electronic apparatus. Accordingly, not all electronic apparatuses present in the theater may respond to the voice in the movie.

Figure 2:
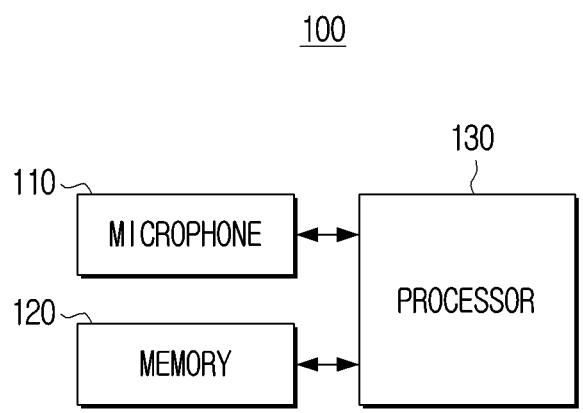
FIG. 2 is a block diagram illustrating an electronic apparatus according to an embodiment.

FIG. 2 is a block diagram illustrating an electronic apparatus according to an embodiment.

Referring to FIG. 2, the electronic apparatus may be comprised of a microphone 110, a memory 120, and a processor 130.

The electronic apparatus in accordance with various embodiments of the disclosure may include at least one from among a smartphone, a tablet personal computer (PC), a mobile phone, a desktop PC, a laptop PC, a personal digital assistance (PDA), and a portable multimedia player (PMP). In some embodiments, the electronic apparatus 100 may include, for example, at least one from among a television, a digital video disk (DVD) player, and a media box (e.g., Samsung HomeSync™, Apple TV®, or Google TV™.

The microphone 110 may be configured to receive user voice in an activated state. For example, the microphone 110 may be formed integrally at a top side or a front surface direction, side surface direction, or the like, of the electronic apparatus 100. The microphone 110 may include various configurations such as, for example, and without limitation, a microphone configured to collect user voice in analog form, an amplifier configured to amplify the collected user voice, an A/D converter circuit configured to convert the amplified user voice to a digital signal by sampling, a filter circuit configured to remove noise elements from the converted digital signal, or the like.

The memory 120 may be implemented as an internal memory such as a read only memory (ROM), electrically erasable programmable read-only memory (EEPROM), a random access memory (RAM), or the like, included in the processor 130, or implemented as a separate memory from the processor 130. In this case, the memory 120 may be implemented in the form of a memory embedded in the electronic apparatus 100 according to a data storage use, or in the form of a memory detachable from the electronic apparatus 100. For example, the data for the driving of the electronic apparatus 100 may be stored in a memory embedded to the electronic apparatus 100, and data for an expansion function of the electronic apparatus 100 may be stored in a memory detachable from the electronic apparatus 100.

The memory embedded in the electronic apparatus 100 may be implemented as at least one from among a volatile memory (e.g., a dynamic RAM (DRAM), a static RAM (SRAM), or a synchronous dynamic RAM (SDRAM)), or a non-volatile memory (e.g., an one time programmable ROM (OTPROM), a programmable ROM (PROM), an erasable and programmable ROM (EPROM), an EEPROM, a mask ROM, a flash ROM, a flash memory (e.g., NAND flash or NOR flash), a hard disk drive (HDD), or a solid state drive (SSD). In the case of a memory attachable/detachable to the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The processor 130 may be configured to perform an overall control operation of the electronic apparatus 100. Specifically, the processor 130 may control the overall operation of the electronic apparatus 100.

The processor 130 may be implemented as a digital signal processor (DSP) configured to process digital signals, a microprocessor, or a time controller (TCON). However, the processor is not limited thereto, and may include one or more from among a central processing unit (CPU), a micro controller unit (MCU), a micro processing unit (MPU), a controller, an application processor (AP), a graphics-processing unit (GPU), a communication processor (CP), or an ARM processor, or may be defined by the corresponding term. In addition, the processor 130 may be implemented as a System on Chip (SoC) or large scale integration (LSI) embedded with a processing algorithm, and may be implemented in the form of a field programmable gate array (FPGA). In addition, the processor 130 may be configured to perform various functions by executing computer executable instructions stored in the memory 120.

The electronic apparatus 100 may include a microphone 110 and a memory 120 storing the wakeup word.

The wakeup word may refer to a word which is to be recognized as a prerequisite for performing the voice recognition function. For example, the user who desires to listen to music by uttering 'turn on music' may have to utter 'turn on music' after uttering the wakeup word (e.g., 'hi, Bixby').

The processor 130 may be configured to change, based on the pre-determined event being identified as having occurred based on context information of the electronic apparatus, a first threshold value (wakeup word threshold value; or, a threshold value of a wakeup word) for recognizing the wakeup word, and based on receiving a first user voice through the microphone 110, obtain a similarity value between a first text information which corresponds to the first user voice and the wakeup word, and based on the obtained similarity value being greater than or equal to the changed first threshold value (wakeup word threshold value), perform voice recognition on a second text information which corresponds to a second user voice which is received through the microphone 110 after the first user voice.

The processor 130 may be configured to obtain context information. Here, the context may refer to the electronic apparatus 100 or a situation which corresponds to the user of the electronic apparatus 100. For example, context may refer to watching a movie, in a meeting, exercising, sleeping, or the like. Here, context information may refer to a variety of information which is used to determine the context.

The context information may include at least one from among schedule information, application execution information, time information, location information, speed information, acceleration information, audio information, or motion information. The detailed description related to the context information will be described below in FIG. 4.

The processor 130 may be configured to identify whether the pre-determined event has occurred based on the obtained context information. Based on the pre-determined event being identified as having occurred, the processor 130 may be configured to change a wakeup word threshold value (first threshold value). The wakeup word threshold value (first threshold value) may refer to a value which is used for determining whether the wakeup word has been recognized.

The processor 130 may be configured to receive the first user voice through the microphone 110 after the electronic apparatus 100 is changed. The processor 130 may be configured to obtain the first text information which corresponds to the first user voice based on the audio-text conversion technology.

The first user voice may refer to a user voice which is received while a specific button included in the electronic apparatus 100 is pressed or an operation of touching a specific user interface (UI) which is displayed in a display 140 is occurring. The reason for determining whether to change the wakeup word threshold value (first threshold value) in the embodiment which determines whether the user voice is the wakeup word only in a preliminary operation such as pressing the specific button or touching the specific UI is because the preliminary operation may not be the intent of the user. For example, based on the user who is watching a movie receiving the preliminary operation and voice in an unintended state, the user may deal with a situation of the wakeup word being recognized.

The processor 130 may be configured to obtain the similarity value between the first text information which corresponds to the obtained first user voice and the wakeup word. The similarity value may refer to a value for determining how similar the first text information is with the wakeup word. Here, it may be identified that the user more accurately utters the wakeup word based on the similarity value being higher.

The processor 130 may be configured to identify whether the similarity value is greater than or equal to the wakeup word threshold value (first threshold value). Based on the similarity value being less than the wakeup word threshold value (first threshold value), it may be identified as the user not having uttered the wakeup word. Based on the similarity value being greater than or equal to the wakeup word threshold value (first threshold value), it may be identified as the user having uttered the wakeup word.

Here, the second user voice after the first user voice may be received through the microphone 110. For example, it may be assumed that the user voice of 'hi, Bixby, turn on music' is received. The first user voice may be 'hi, Bixby,' and the second user voice may be 'turn on music.'

The processor 130 may be configured to obtain, based on the similarity value being greater than or equal to the wakeup word threshold value (first threshold value), the second text information which corresponds to the second user voice. Then, the processor 130 may be configured to perform the voice recognition based on the obtained second text information.

In an example, the processor 130 may be configured to perform the voice recognition on the second text information on its own by using a stored voice recognition model. In another example, the processor 130 may be configured to obtain a voice recognition result on the second text information by using an external voice recognition server. Here, the processor 130 may be configured to transmit the second text information to the external voice recognition server, and receive the voice recognition result which corresponds to the second text information from the external voice recognition server.

The processor 130 may be configured to identify, based on time information included in the context information matching with (or corresponding to) time information which corresponds to the pre-determined event, the pre-determined event as having occurred, and based on location information included in the context information matching with location information which corresponds to the pre-determined event, identify as the pre-determined event having occurred.

The processor 130 may be configured to receive at least one information from among the current time information or the current location information in real-time through an external server (e.g., telecommunication company server). Accordingly, the processor 130 may be configured to identify, based on the current time matching with the specific time (e.g., movie viewing time, meeting time), the pre-determined event as having occurred. In addition, the processor 130 may be configured to identify, based on the current location matching with the specific location (theater, work), the pre-determined event as having occurred.

In an example, the processor 130 may be configured to identify whether the pre-determined event has occurred by considering only the time information. In another example, the processor 130 may be configured to identify whether the pre-determined event has occurred by considering only the location information. In still another example, the processor 130 may be configured to identify whether the pre-determined event has occurred by considering both the time information and the location information.

The processor 130 may be configured to store schedule information as the pre-determined event based on a pre-determined event key-word (or, a key-word of a pre-determined event) being included in the schedule information, and based on the time information included in the context information matching with the time information which corresponds to the schedule information, identify the pre-determined event as having occurred.

The processor 130 may be configured to obtain schedule information. The processor 130 may be configured to identify whether the pre-determined event key-word is included in the obtained schedule information. Based on the pre-determined event key-word being included in the obtained schedule information, the processor 130 may be configured to generate a new event based on the obtained schedule information. Further, the processor 130 may be configured to store the generated event as the pre-determined event in the memory 120.

After the generated event is stored as the pre-determined event, when the time included in the corresponding schedule information arrives, the processor 130 may be configured to identify the pre-determined event as having occurred.

The detailed description related to the above will be described below in FIGS. 16 and 17.

The processor 130 may be configured to identify a number of speakers uttering voices based on the audio information, and based on the number of identified speakers being greater than or equal to a second threshold value, identify the pre-determined event as having occurred.

The processor 130 may be configured to determine whether to change the wakeup word threshold value (first threshold value) based on whether the pre-determined event has occurred. Here, the pre-determined event may refer to a meeting. The processor 130 may be configured to control, based on the context of the user being in a meeting being identified, so that the wakeup word is not easily recognized by increasing the wakeup word threshold value (first threshold value).

In order to determine whether the context is being in a meeting, the processor 130 may be configured to analyze the audio information. Specifically, the processor 130 may be configured to identify the number of speakers in the audio information. Further, based on the number of identified speakers being greater than or equal to the threshold value (second threshold value), the processor 130 may be configured to identify the current context as being in a meeting. Further, the processor 130 may be configured to change the wakeup word threshold value (first threshold value).

The detailed description related to the above will be described below in FIG. 7.

The electronic apparatus 100 may further include a sensor 180, a camera 190, and a communication interface 150, and the processor 130 may be configured to obtain at least one from among speed information or acceleration information based on sensing data obtained through the sensor 180, obtain audio information based on the user voice obtained through the microphone 110, obtain motion information based on an image obtained through the camera 190, and receive time information or location information from an external server through the communication interface 150.

The sensor 180 may be implemented as one sensor, or may be implemented as a plurality of sensors according to the embodiment. For example, the speed sensor and the acceleration sensor may be provided in the electronic apparatus 100, respectively.

The electronic apparatus 100 may further include a display 140, and the processor 130 may be configured to control, based on the pre-determined event being identified has having occurred based on the context information, the display 140 to display the user interface (UI) for changing the first threshold value (wakeup word threshold value).

The processor 130 may be configured to not change the wakeup word threshold value (first threshold value) immediately despite the pre-determined event having been identified. This is to check the intent of the user once more.

The processor 130 may be configured to determine whether to change the wakeup word threshold value (first threshold value) based on the user input selected through the displayed UI. The user input may refer to a selection result by the user input through the UI for checking whether to change the wakeup word threshold value (first threshold value).

Based on the user input for changing the first threshold value (wakeup word threshold value) being received through the displayed UI, the processor 130 may be configured to change the first threshold value (wakeup word threshold value) based on the user input.

The processor 130 may be configured to delete, based on the user input for maintaining the first threshold value (wakeup word threshold value) being received through the displayed UI, the pre-determined event.

The user input of maintaining the first threshold value (wakeup word threshold value) may refer to a user input for not changing the wakeup word threshold value (first threshold value).

Here, the user input for maintaining the wakeup word threshold value (first threshold value) being received may be analyzed as the determination that the pre-determined event has occurred may have in part been made in error. Accordingly, the processor 130 may be configured to delete the corresponding event. The deleting of the pre-determined event may not mean the deleting of all events, and may mean an event having the highest confidence from among a plurality of events.

The detailed description related to the above will be described below in FIG. 13.

The processor 130 may be configured to obtain an event confidence value which corresponds to the pre-determined event based on the context information, and based on the obtained event confidence value being greater than or equal to a third threshold value (event threshold value), change the first threshold value (wakeup word threshold value).

The event confidence value may refer to a value for determining whether the identified context is a match with the event by how much based on the obtained context information. For example, it may be assumed that the pre-determined event is 'watching movie.' The processor 130 may be configured to obtain a probability value which is to correspond to the event of 'watching movie' based on the obtained context information. Here, the probability value to be obtained may be the event confidence value. Based on the event confidence being high, the probability of it being the corresponding event may be high.

Based on the pre-determined event being a plurality of events, the processor 130 may be configured to obtain an event confidence which corresponds to the respective events.

Further, the processor 130 may be configured to determine the event having an event confidence of a threshold value or more from among the obtained events as a finally identified event. Further, the processor 130 may be configured to identify whether the event confidence which corresponds to the finally determined event is greater than or equal to an event threshold value (third threshold value).

The detailed operation related to the event confidence will be described below in FIGS. 12 to 15.

The electronic apparatus 100 of the disclosure prevents the wakeup word from being recognized in a situation not intended by the user. For example, the electronic apparatus 100 of the disclosure may prevent the wakeup word from being recognized in error while watching a movie or in a meeting.

The electronic apparatus 100 of the disclosure may be configured to pre-store the pre-determined event, and determine whether the pre-determined event has occurred based on the context information which is to be collected. Further, based on the pre-determined event occurring, the wakeup word threshold value (first threshold value) may be changed. The electronic apparatus 100 of the disclosure is configured to not fully inactivate the voice recognition function, and change the wakeup word threshold value (first threshold value) which is used in the recognition of the wakeup word.

Even when the voice recognition function is considered unnecessary, there may be the possibility that the user will use the voice recognition function as an exception.

The wakeup word threshold value (first threshold value) being increased may be assumed. Based on the wakeup word threshold value (first threshold value) being increased, the wakeup word may not be easily recognized. This is because the similarity which is compared with the wakeup word threshold value (first threshold value) needs to be higher. However, because the wakeup word is not completely recognized even in this case, the user may be able to have the wakeup word recognized through a more accurate pronunciation or a louder sound. Based on the electronic apparatus 100 trying to more accurately recognize the wakeup word, the user may be able to use the voice recognition function by having the wakeup word recognized in a general method of the related art. Accordingly, despite the wakeup word threshold value (first threshold value) being changed automatically in an exceptional situation (while watching a movie or in a meeting), the wakeup word may be recognized. However, because the effort is accompanied by a strong intent of the user, the recognition of the wakeup word may be a recognition of the wakeup word which coincides with the user intent.

Accordingly, the electronic apparatus 100 of the disclosure may be configured to consider the possibility of the user uttering the wakeup word even in specific situations.

In addition, because the electronic apparatus 100 displays the UI for checking whether to change the wakeup word threshold value (first threshold value) to the user a second time, the user may select whether to change the recognition of the wakeup word to be easy or difficult in the current situation. Further, the electronic apparatus 100 may be configured to store the selection of the user and apply the stored user selection to various determination operations thereafter.

In the above, the simple configurations which comprise the electronic apparatus 100 have been illustrated and described, but various configurations may be additionally provided in an embodiment. The above will be described below with reference to FIG. 3.

Figure 3:
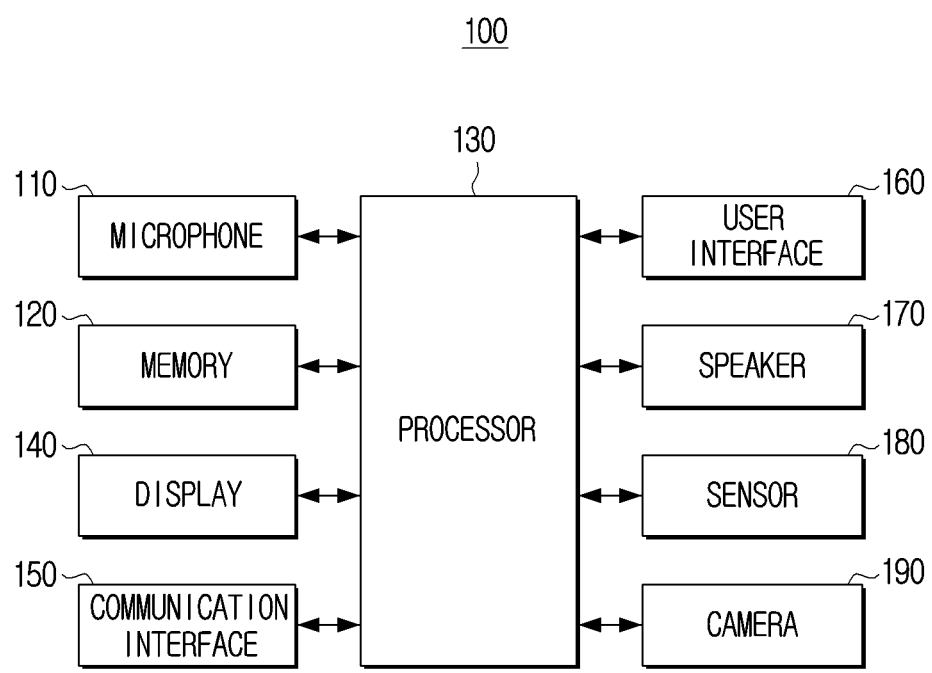
FIG. 3 is a block diagram illustrating a detailed configuration of the electronic apparatus of FIG. 2.

FIG. 3 is a block diagram illustrating a detailed configuration of the electronic apparatus of FIG. 2.

Referring to FIG. 3, the electronic apparatus 100 may include at least one from among a microphone 110, a memory 120, a processor 130, a display 140, a communication interface 150, a user interface 160, a speaker 170, a sensor 180, or a camera 190.

Among the operations of the microphone 110, the memory 120, and the processor 130, redundant descriptions of operations which are the same as what is described above will be omitted.

The display 140 may be implemented as, for example, and without limitation, a liquid crystal display (LCD), an organic light emitting diodes (OLED) display, a plasma display panel (PDP), or the like. The display 140 may also include a driving circuit, a backlight unit, and the like which may be implemented in a form such as a-si TFT, low temperature poly silicon (LTPS) TFT, organic TFT (OTFT), or the like. The display 140 may be implemented with a touch screen coupled with a touch sensor, a flexible display, a 3D display, or the like.

In addition, according to an embodiment, the display 140 may not only include a display panel which outputs an image, but also a bezel which houses the display panel. Specifically, according to an embodiment, the bezel may include a touch sensor for detecting user interaction.

The communication interface 150 may be a configuration which performs communication with an external apparatus of various types according to a communication method of various types. The communication interface 150 may include a Wi-Fi module, a Bluetooth module, an infrared communication module, a wireless communication module, and the like. The respective communication modules may be implemented in at least one hardware chip form.

The communication interface 150 which includes the Wi-Fi module and the Bluetooth module may be configured to perform communication in the Wi-Fi method and Bluetooth method, respectively. When using the Wi-Fi module or the Bluetooth module, various connection information such as SSID and session key may first be transmitted and received, and after communicatively coupling by using the above, various information may be transmitted and received.

The infrared communication module may be configured to use the infrared rays present between visible rays and millimeter waves to perform communication according to an infrared data association (IrDA) technology which transmit data wirelessly at short range.

The wireless communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), or the like in addition to the above-described communication methods.

In addition thereto, the communication interface 150 may be configured to use a local area network (LAN) module, an Ethernet module, a pair cable, a coaxial cable, an optical fiber cable, an ultra wide-band (UWB) module, or the like to include at least one from among the wired communication modules which perform communication.

The user interface 160 may be implemented as a device such as a button, a touch pad, a mouse, and a keyboard, or even as a touch screen cable of performing the above-described display function and an operation input function together therewith. The button may be a button of various types such as, for example, and without limitation a mechanical button, a touch pad, wheel, or the like formed at a random area such as a front surface part, a side surface part, a rear surface part, or the like of the exterior of the main body of the electronic apparatus 100.

The speaker 170 may be an element configured to output not only various audio data processed in the input and output interface, but also various notification sounds, voice messages, or the like.

The sensor 180 may include at least one from among a speed sensor configured to sense moving speed and moving direction, and an acceleration sensor configured to sense acceleration and direction of acceleration.

The camera 190 may be a configuration for capturing a subject and generating a captured image, and the captured image may be a concept including both a moving image and a still image. The camera 190 may be configured to obtain an image on at least one external device, and may be realized as a camera, a lens, an infrared sensor, or the like.

The camera 190 may include a lens and an image sensor. Types of the lens may include a general use lens, a wide-angle lens, a zoom lens and the like, and may be determined according to the type, characteristics, use environment or the like of the electronic apparatus 100. A complementary metal oxide semiconductor (CMOS), a charge coupled device (CCD), and the like may be used as the image sensor.

The camera 190 may be configured to output incident light as an image signal. Specifically, the camera 190 may include a lens, pixels, and an AD converter. The lens may be configured to gather light of the subject and form an optical image in an imaging area. The pixels may output light entering through the lens as an image signal of an analog form. Then, the AD converter may be configured to convert the image signal in analog form to an image signal of a digital form and output the converted image signal. Specifically, the camera 190 may be disposed to capture the front surface direction of the electronic apparatus 100, and generate a captured image by capturing the user present at the front surface of the electronic apparatus 100.

The electronic apparatus 100 according to an embodiment may be configured to transmit a digital voice signal which is received in a voice recognition server. In this case, the voice recognition server may be configured to use speech to text (STT) to convert the digital voice signal to text information. The voice recognition server may be configured to transmit text information to a different server or the electronic apparatus to perform a search which corresponds to text information, and in some situations perform the search directly.

The electronic apparatus 100 according to another embodiment may be configured to apply the speech to text (STT) function directly to the digital voice signal to convert to text information, and transmit the converted text information to an external server.

Figure 4:
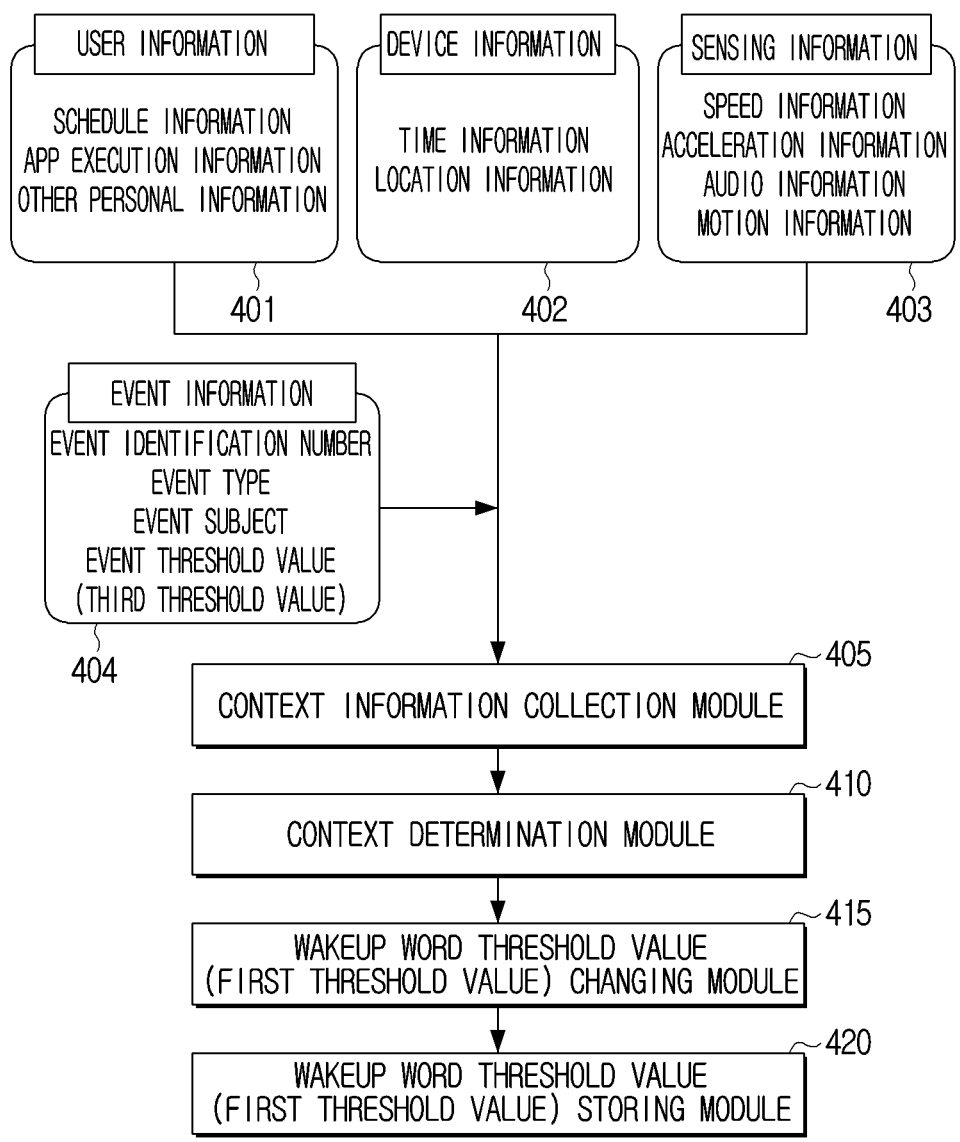
FIG. 4 is a diagram illustrating an operation related to context information which is collected in an electronic apparatus according to various embodiments.

FIG. 4 is a diagram illustrating an operation related to context information which is collected in an electronic apparatus according to various embodiments.

Referring to FIG. 4, the electronic apparatus 100 may be configured to store context information. Specifically, the context information may include at least one from among user information 401, device information 402, or sensing information 403.

The user information 401 may include at least one from among schedule information, application execution information, or other personal information. The schedule may include at least one from among the time, the location, or additional information related to the schedule of the user of the electronic apparatus 100. For example, the schedule information may be 'Jan. 20, 2021, from 19:00 to 21:00 PM, at Seoul Gangnam Station, watching movie.' Here, the application execution information may refer to information related to an app (or, application) which is currently being executed in the electronic apparatus 100. The other personal information may refer to various information related to the private user. The other personal information may refer to various information related with the living habits or the working environment of the user. For example, it may be assumed that a specific user is working late, the electronic apparatus 100 may be configured to store the late work as other personal information. Then, the electronic apparatus 100 may be configured to provide the voice recognition function suitable to the environment for performing late work.

The device information 402 may include at least one from among time information or location information. The time information may refer to the current time from the location that the electronic apparatus 100 is located. The location information may refer to the location that the electronic apparatus 100 is present. The electronic apparatus 100 may be configured to request and receive at least one from among the time information or the location information from the external server.

The sensing information 403 may include at least one from among speed information, acceleration information, audio information or motion information. The speed information may include at least one from among a moving speed or a moving direction of the electronic apparatus 100. The electronic apparatus 100 may include the speed sensor, and obtain speed information based on the sensing data obtained from the speed sensor.

The acceleration information may include at least one from among acceleration and direction of acceleration of the electronic apparatus 100. The electronic apparatus 100 may include the acceleration sensor, and obtain acceleration information based on the sensing data obtained from the acceleration sensor.

The audio information may refer to an audio signal (or, audio data) received from the microphone 110. The electronic apparatus 100 may include the microphone 110, and obtain the audio information based on the audio signal obtained from the microphone 110.

The motion information may refer to a user motion identified based on the image signal. The electronic apparatus may include the camera 190, identify a gesture or motion of the user based on the obtained image signal, and obtain motion information based on the identified gesture or motion.

The electronic apparatus 100 may be configured to store event information 404 in the memory 120.

The event information 404 may refer to information related to the pre-determined event stored in the memory 120. The event information 404 may include at least one from among an event identification number, an event type, an event subject, and an event threshold value (third threshold value). The event identification number may refer to a unique number for distinguishing respective events. The event type may refer to information for distinguishing to which category the event belongs. For example, the event type may be time, location, operation, or the like. The detailed description with respect to the above will be described below in FIG. 14. The event threshold value (third threshold value) may refer to a reference value for determining whether the various context identified based on the context information matches with the pre-determined event. The detailed description with respect to the above will be described below in FIG. 12.0

The electronic apparatus 100 may include a context information collection module 405, a context determination module 410, a wakeup word threshold value (first threshold value) changing module 415, and a wakeup word threshold value storing module 420.

The context information collection module 405 may be configured to obtain the user information 401 stored in the memory 120, the device information 402 received from the external server, and the sensing information 403 obtained from the sensor 180.

The context determination module 410 may be configured to identify the context of the electronic apparatus 100 based on the context information obtained from the context information collection module 405. Specifically, the context determination module 410 may be configured to determine whether the user of the electronic apparatus 100 is currently in what circumstance. Then, the context determination module 410 may be configured to determine whether the identified context matches with the pre-determined event.

The wakeup word threshold value (first threshold value) changing module 415 may be configured to change, based on the context identified by the context determination module 410 matching with the pre-determined event, the wakeup word threshold value (first threshold value).

The wakeup word threshold value (first threshold value) storing module 420 may be configured to store, based on the wakeup word threshold value (first threshold value) being changed, the changed wakeup word threshold value (first threshold value) change result information in the memory 120. The change result information which is stored in the wakeup word threshold value (first threshold value) storing module 420 may be used in an operation of the following context determination module.

Figure 5:
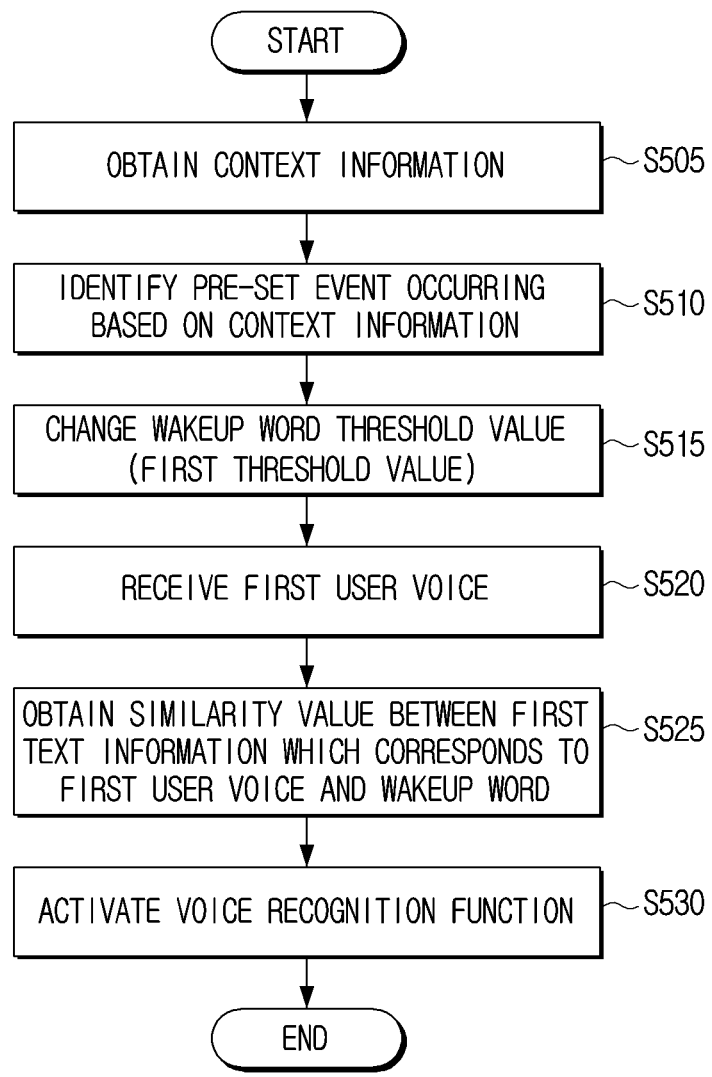
FIG. 5 is a flowchart illustrating an operation of an electronic apparatus recognizing a wakeup word and activating a voice recognition function.

FIG. 5 is a flowchart illustrating an operation of an electronic apparatus recognizing a wakeup word and activating a voice recognition function.

Referring to FIG. 5, the electronic apparatus 100 may be configured to obtain the context information (S505). The context may refer to the electronic apparatus 100 or a situation which corresponds to the user of the electronic apparatus 100. For example, the context may refer to watching a movie, in a meeting, exercising, sleeping, or the like. The context information may refer to various information which is used to determine the context. Specifically, the description related to context information has been described in FIG. 4.

In addition, the electronic apparatus 100 may be configured to identify whether the pre-determined event has occurred based on the context information (S510). The electronic apparatus 100 may be configured to identify the context based on the obtained context information, and identify whether the identified context matches with the pre-determined event.

In addition, the electronic apparatus 100 may be configured to change, based on the pre-determined event being identified as having occurred, the wakeup word threshold value (first threshold value) (S515). The wakeup word threshold value (first threshold value) may refer to a reference value determining whether the wakeup word is recognized.

In addition, the electronic apparatus 100 may be configured to receive the first user voice after changing the wakeup word threshold value (first threshold value) (S520). Then, the electronic apparatus may be configured to obtain the similarity value between the first text information which corresponds to the first user voice and the wakeup word (S525). For example, the electronic apparatus 100 may be configured to determine whether the voice uttered by the user matches with a pre-determined wakeup word by how much, and obtain whether or not it matches as a similarity value.

In addition, the electronic apparatus 100 may be configured to activate, based on the obtained similarity value being greater than or equal to the wakeup word threshold value (first threshold value), the voice recognition function (S530). The activating the voice recognition function may refer to an operation of establishing a communication session with the voice recognition server to perform voice recognition or an operation of executing a voice recognition application.

Figure 6:
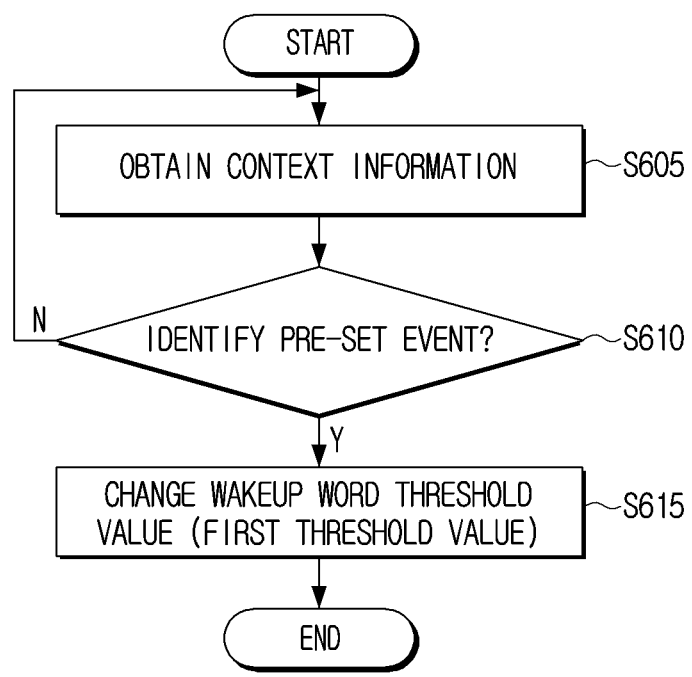
FIG. 6 is a flowchart illustrating an operation of an electronic apparatus identifying a pre-determined event.

FIG. 6 is a flowchart illustrating an operation of an electronic apparatus identifying a pre-determined event.

Referring to FIG. 6, the electronic apparatus 100 may be configured to obtain the context information (S605). Then, the electronic apparatus 100 may be configured to identify whether the pre-determined event has occurred based on the obtained context information (S610). Based on identifying that the pre-determined event has not occurred (S610—N), the electronic apparatus 100 may be configured to perform repeatedly the operation of obtaining the context information continuously and identifying whether the event has occurred. Based on identifying that the pre-determined event has occurred (S610—Y), the electronic apparatus 100 may be configured to change the wakeup word threshold value (first threshold value) (S615).

The example operation of identifying the occurrence of the pre-determined event will be described in FIGS. 7 and 8.

Figure 7:
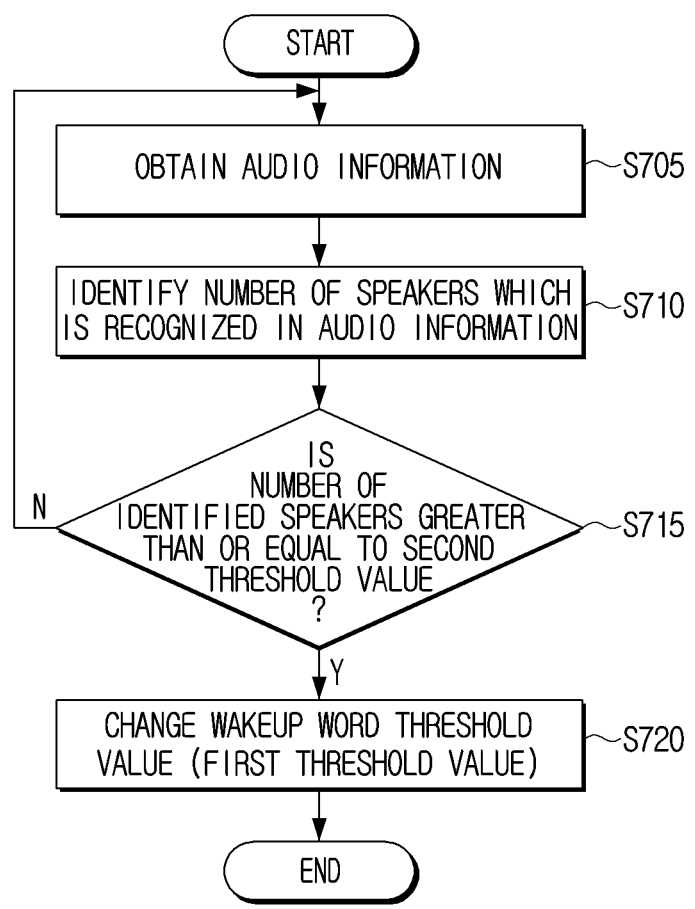
FIG. 7 is a flowchart illustrating an operation of an electronic apparatus identifying a pre-determined event according to an embodiment.

FIG. 7 is a flowchart illustrating an operation of an electronic apparatus identifying a pre-determined event according to an embodiment.

Referring to FIG. 7, the electronic apparatus 100 may be configured to obtain audio information (S705). The audio information may be information which corresponds to the voice signal that is obtained through the microphone 110 of the electronic apparatus 100. The audio information may be context information of the electronic apparatus 100.

In addition, the electronic apparatus 100 may be configured to identify the number of speakers recognized in the audio information based on the obtained audio information (S710). Specifically, the electronic apparatus 100 may be configured to identify the number of users uttering voices in the audio information obtained for a pre-determined time. For example, the current electronic apparatus 100 may be configured to identify how many people are currently conversing in the recorded sound.

The electronic apparatus 100 may be configured to identify whether the number of identified speakers is greater than or equal to the second threshold value (S715). Based on the number of identified speakers being less than the second threshold value (S715—N), the electronic apparatus 100 may be configured to obtain the audio information repeatedly, identify the number of speakers, and identify whether the number of identified speakers is greater than or equal to the second threshold value.

In addition, based on the number of identified speakers being greater than or equal to the second threshold value (S715—Y), the electronic apparatus 100 may be configured to change the wakeup word threshold value (first threshold value) (S720).

The identifying the number of speakers based on the audio information is to analyze the context of the electronic apparatus 100 currently. The voice recognition function of the related art may be performed in a situation in which the user is alone. Accordingly, when a plurality of speakers is identified in the audio information, the electronic apparatus 100 may be configured to identify as a context in which the voice recognition is not to be performed. For example, based on identifying five speakers conversing with one another in the audio information, it may be identified as currently being in a meeting. Further, the wakeup word threshold value (first threshold value) may be changed (increased) so that the wakeup word is not easily recognized in a meeting situation.

Figure 8:
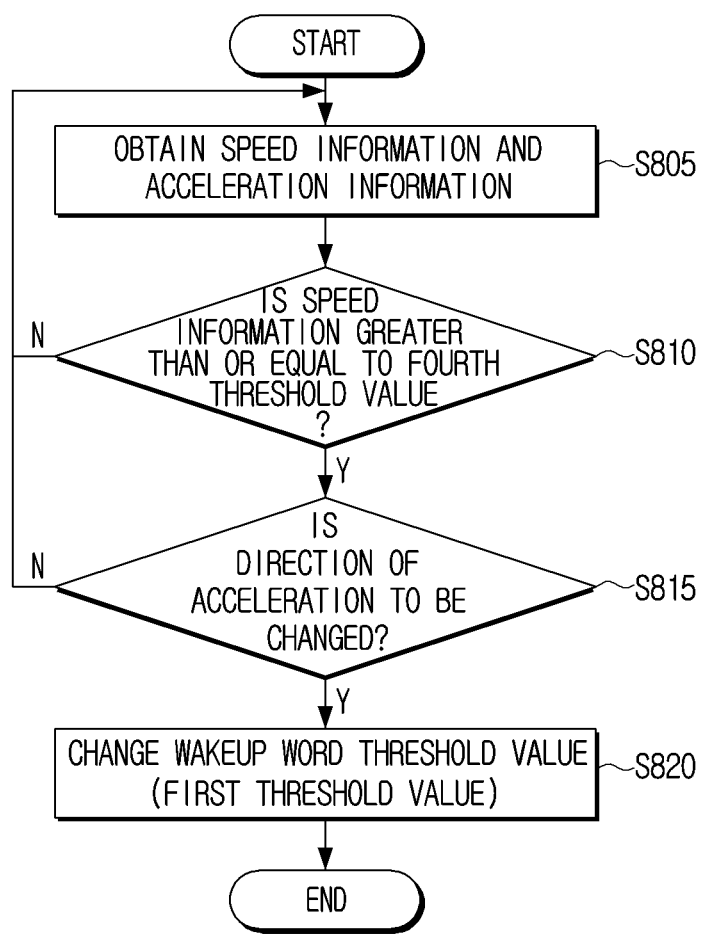
FIG. 8 is a flowchart illustrating an operation of an electronic apparatus identifying a pre-determined event according to another embodiment.

FIG. 8 is a flowchart illustrating an operation of an electronic apparatus identifying a pre-determined event according to another embodiment.

Referring to FIG. 8, the electronic apparatus 100 may be configured to obtain speed information and acceleration information (S805). The speed information may include at least one from among the speed value or the moving direction. The acceleration information may include at least one from among the acceleration value or acceleration direction. The speed information and the acceleration information may be obtained through one sensor, and may be obtained through the speed sensor and acceleration sensor respectively according to an embodiment.

In addition, the electronic apparatus 100 may be configured to identify whether the speed value included in the speed information is greater than or equal to a fourth threshold value (S810). Here, based on the speed value being less than the fourth threshold value (S810—N), the electronic apparatus 100 may be configured to obtain the speed information and the acceleration information, and may repeat the operation of identifying whether the speed value is less than the fourth threshold value.

Based on the speed value being greater than or equal to the fourth threshold value (S810—Y), the electronic apparatus 100 may be configured to identify whether the direction of acceleration may be changed (S815). Specifically, the electronic apparatus 100 may be configured to determine whether the direction of acceleration may be changed for a pre-determined time. In addition, the electronic apparatus 100 may be configured to identify whether the direction of acceleration is changed by a threshold number of times or more for the pre-determined time.

Based on the direction of acceleration being identified as not having changed (S815—N), the electronic apparatus 100 may be configured to obtain the speed information and the acceleration information repeatedly.

Based on the direction of acceleration being identified as having changed (S815—Y), the electronic apparatus 100 may be configured to change the wakeup word threshold value (first threshold value) (S820).

The reason for determining the direction of acceleration and not the moving direction is to distinguish a situation of the user running and a situation of riding an automobile. A user holding the electronic apparatus 100 in hand and running may be assumed. Here, the electronic apparatus 100 may be moved backwards and forwards according to the swaying of the user's hand. Each time the user's hand changes direction of movement the direction of acceleration may change. However, because the user is running, the movement direction of the user may be the same as "forward." Accordingly, the electronic apparatus 100 may check whether the user is exercising by checking whether there is the periodic change in direction of acceleration and not the moving direction. Based on the direction of acceleration changing periodically, the electronic apparatus 100 may be configured to identify as the user exercising.

In another example, in a situation of driving an automobile, the moving direction and direction of acceleration of the user may be constant. In a driving situation, the direction of acceleration may be when stepping on an accelerator pedal (positive direction of acceleration), when not stepping on the accelerator pedal (negative direction of acceleration), and when stepping on a brake pedal (negative direction of acceleration). In order to take the above into consideration, the electronic apparatus 100 may be configured to identify change in direction of acceleration for only a threshold time. For example, whether a change in direction of acceleration occurs within 3 seconds may be identified. The change in direction of acceleration may be identified when exercising because the direction of the user's arm is changed within 3 seconds, but the change in direction of acceleration may not be identified when driving because it is rare for the automobile to accelerate and then step on the brakes within 3 seconds.

Figure 9:
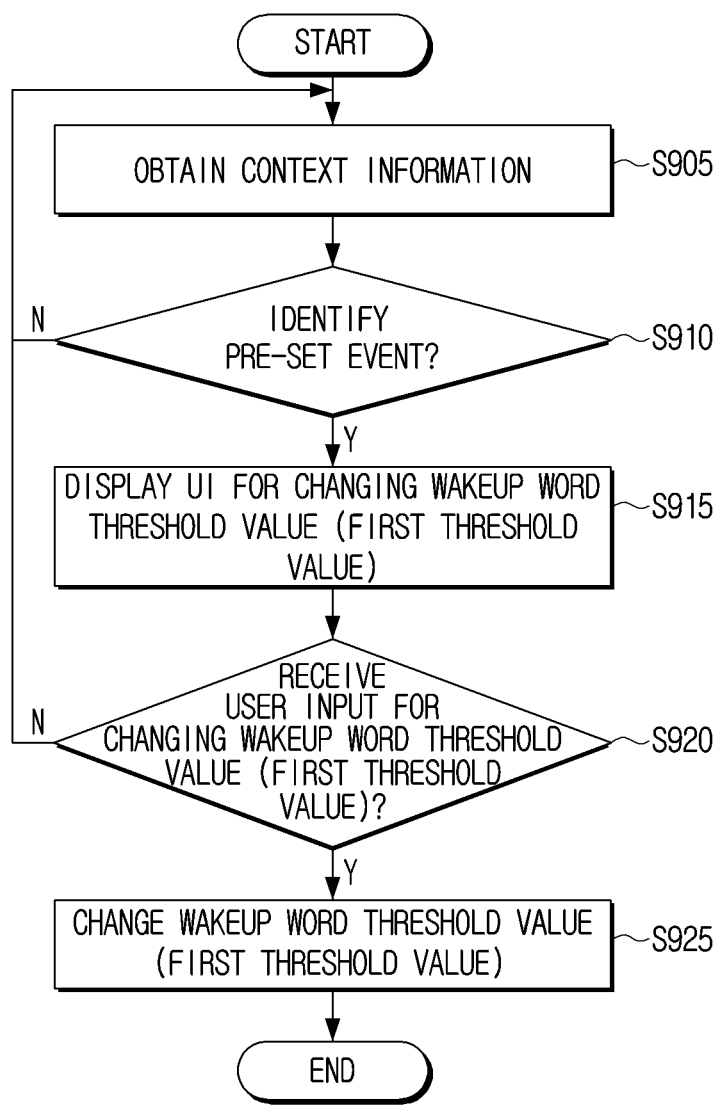
FIG. 9 is a flowchart illustrating an operation of an electronic apparatus displaying a UI for changing a wakeup word.

FIG. 9 is a flowchart illustrating an operation of an electronic apparatus displaying a UI for changing a wakeup word.

Referring to FIG. 9, operations S905 and S910 in FIG. 9 may correspond to operations S605 and S610 in FIG. 6. Here, based on a pre-determined event being identified (S910—Y), the electronic apparatus 100 may be configured to display a UI for changing the wakeup word threshold value (first threshold value) (S915). Then, the user may select whether to change the wakeup word threshold value (first threshold value) through the displayed UI. Here, the selection operation may be determined through the input of the user.

The electronic apparatus 100 may be configured to identify whether the user input for changing wakeup word threshold value (first threshold value) is received through the UI (S920). Based on the user input for changing wakeup word threshold value (first threshold value) not being received through the UI (S920—N), the electronic apparatus 100 may be configured to maintain the wakeup word threshold value (first threshold value) and repeat the operation of obtaining context information. In addition, the electronic apparatus 100 may be configured to change, based on the user input for changing the wakeup word threshold value (first threshold value) being received through the UI (S920—Y), the wakeup word threshold value (first threshold value) (S925).

Figure 10:
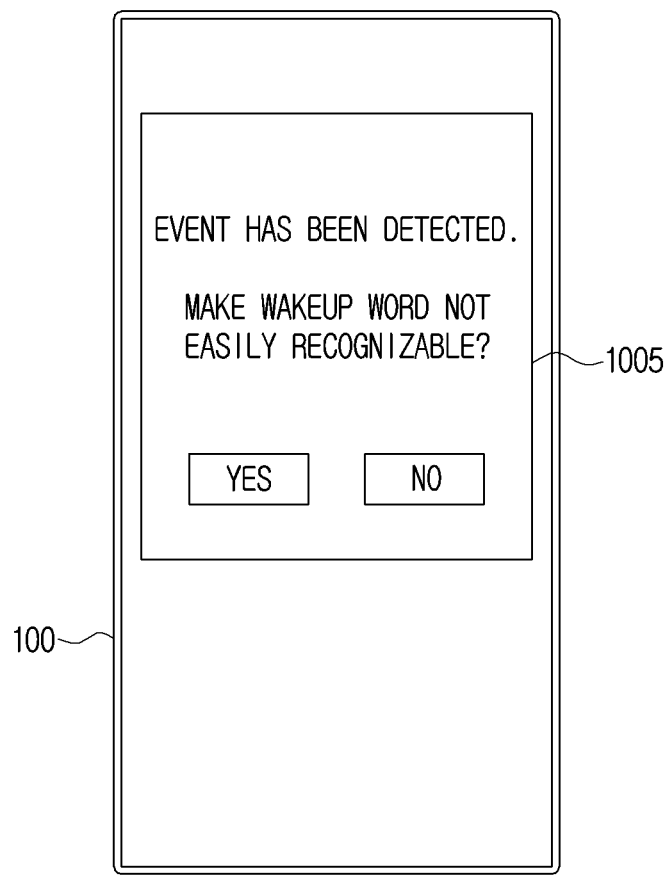
FIG. 10 is a diagram illustrating a UI for changing a threshold value of a wakeup word.

FIG. 10 is a diagram illustrating a UI for changing a threshold value of a wakeup word.

Referring to FIG. 10, the electronic apparatus 100 may be configured to display the UI 1005 for changing wakeup word threshold value (first threshold value) in the display of the electronic apparatus 100. Here, the UI 1005 may display guide information of "Event has been detected. Make wakeup word not easily recognizable?" The user may select whether to change the wakeup word threshold value (first threshold value) based on the displayed UI 1005.

The making the wakeup word not easily recognizable may refer to increasing the wakeup word threshold value (first threshold value). In addition, the making the wakeup word not easily recognizable may refer to lowering a sensitivity of the wakeup word.

Alternatively, the making the wakeup word easily recognizable may refer to decreasing the wakeup word threshold value (first threshold value). In addition, the making the wakeup word easily recognizable may refer to raising the sensitivity of the wakeup word.

Figure 11:
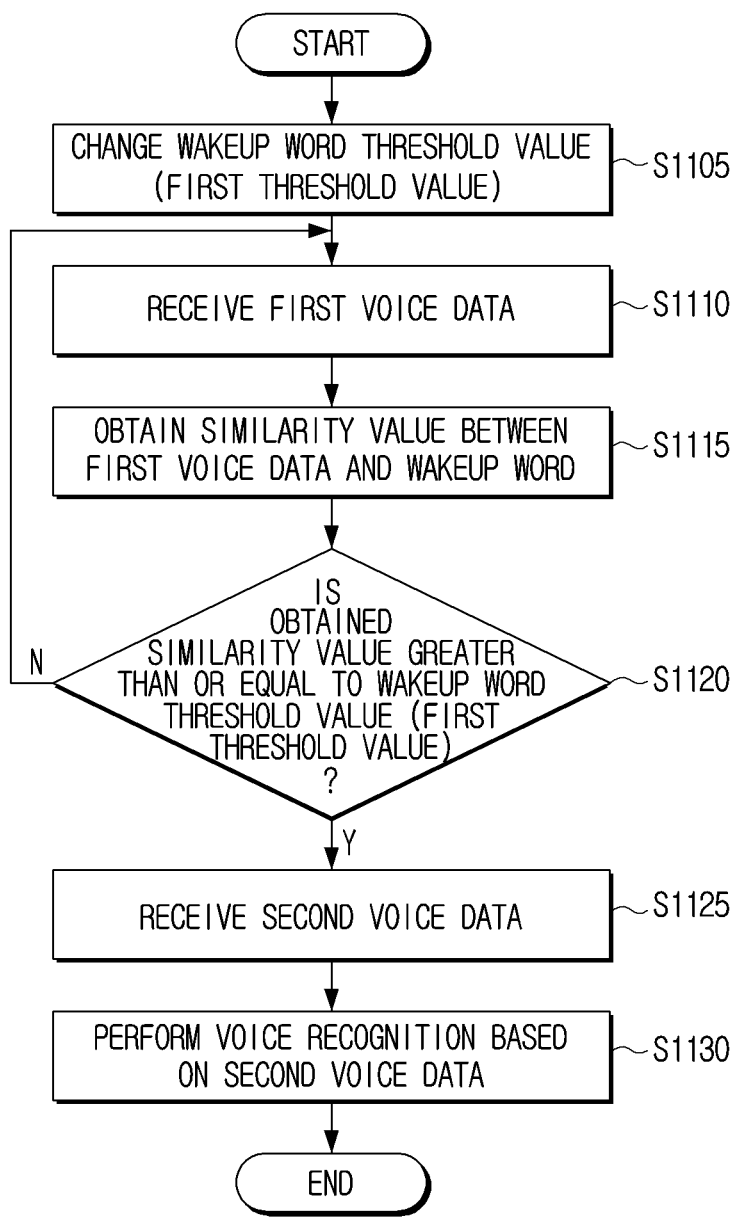
FIG. 11 is a flowchart illustrating an operation of recognizing a wakeup word and an operation of performing voice recognition by an electronic apparatus according to an embodiment.

FIG. 11 is a flowchart illustrating an operation of recognizing a wakeup word and an operation of performing voice recognition by an electronic apparatus according to an embodiment.

Referring to FIG. 11, the electronic apparatus 100 may be configured to change the wakeup word threshold value (first threshold value) (S1105). Here, operation S1105 may refer to all operations in which the wakeup word threshold value (first threshold value) is changed according to various embodiments.

The electronic apparatus 100 may be configured to receive first voice data (S1110) after changing the wakeup word threshold value (first threshold value). Then, the electronic apparatus 100 may be configured to obtain the similarity value between the first voice data and the wakeup word (S1115). Specifically, the electronic apparatus 100 may be configured to obtain first text information which corresponds to the first voice data, and obtain the similarity value between the obtained first text information and the text information of a pre-determined wakeup word.

Then, the electronic apparatus 100 may be configured to identify whether the obtained similarity value is greater than or equal to the wakeup word threshold value (first threshold value) (S1120). Here, based on the obtained similarity value being less than the wakeup word threshold value (first threshold value) (S1120—N), the electronic apparatus 100 may be configured to repeat the operation of receiving the first voice data.

In addition, based on the obtained similarity value being greater than or equal to the wakeup word threshold value (first threshold value) (S1120—Y), the electronic apparatus 100 may be configured to receive second voice data (S1125). Here, the second voice data may refer to voice data which is received after the first voice data, and may refer to an utterance of a remaining portion excluding the utterance which corresponds to the wakeup word in the user voice.

In addition, the electronic apparatus 100 may be configured to perform voice recognition based on the received second voice data (S1130). In an example, the electronic apparatus 100 may be configured to obtain a voice recognition result by performing voice recognition which corresponds to the second voice data on its own. In another example, the electronic apparatus 100 may be configured to obtain the voice recognition result by performing voice recognition which corresponds to the second voice data in the voice recognition server. Here, the electronic apparatus 100 may be configured to transmit the second voice data to the voice recognition server, and receive the voice recognition result from the voice recognition server.

Figure 12:
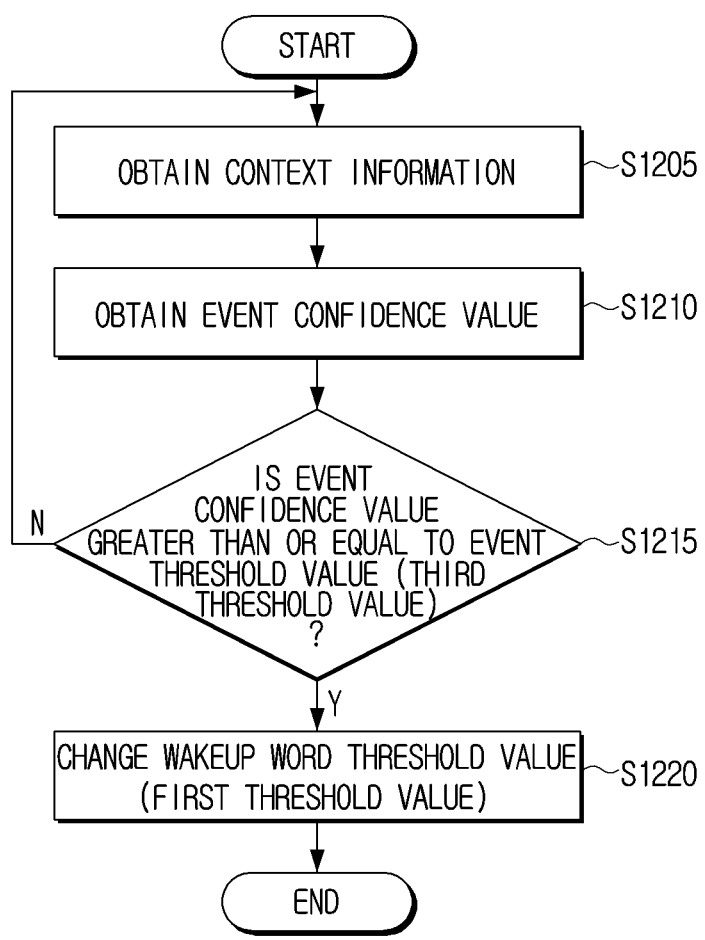
FIG. 12 is a diagram illustrating a process of an electronic apparatus identifying a pre-determined event.

FIG. 12 is a diagram illustrating a process of an electronic apparatus identifying a pre-determined event.

Referring to FIG. 12, the electronic apparatus 100 may be configured to obtain context information (S1205). Then, the electronic apparatus may be configured to obtain the event confidence value based on context information (S1210). Specifically, the electronic apparatus 100 may be configured to identify the context based on context information. Then, the electronic apparatus 100 may be configured to identify whether the identified context is a match with the pre-determined event. The electronic apparatus 100 may be configured to obtain the event confidence value which quantified whether it is a match. That is, the event confidence value may refer to a value which represents how much the context is a match with the pre-determined event. The likelihood of matching with the pre-determined event may be greater so long as the event confidence value is high.

Based on the pre-determined event being a plurality of events, the event confidence to be obtained may be a plurality of event confidences.

The electronic apparatus 100 may be configured to identify whether the obtained event confidence value is greater than or equal to the event threshold value (third threshold value) (S1215). Based on the obtained event confidence value being less than the event threshold value (third threshold value) (S1215—N), the electronic apparatus 100 may be configured to repeat the operation of obtaining context information. Based on the obtained event confidence value being greater than or equal to the event threshold value (third threshold value), the electronic apparatus 100 may be configured to change the wakeup word threshold value (first threshold value).

Figure 13:
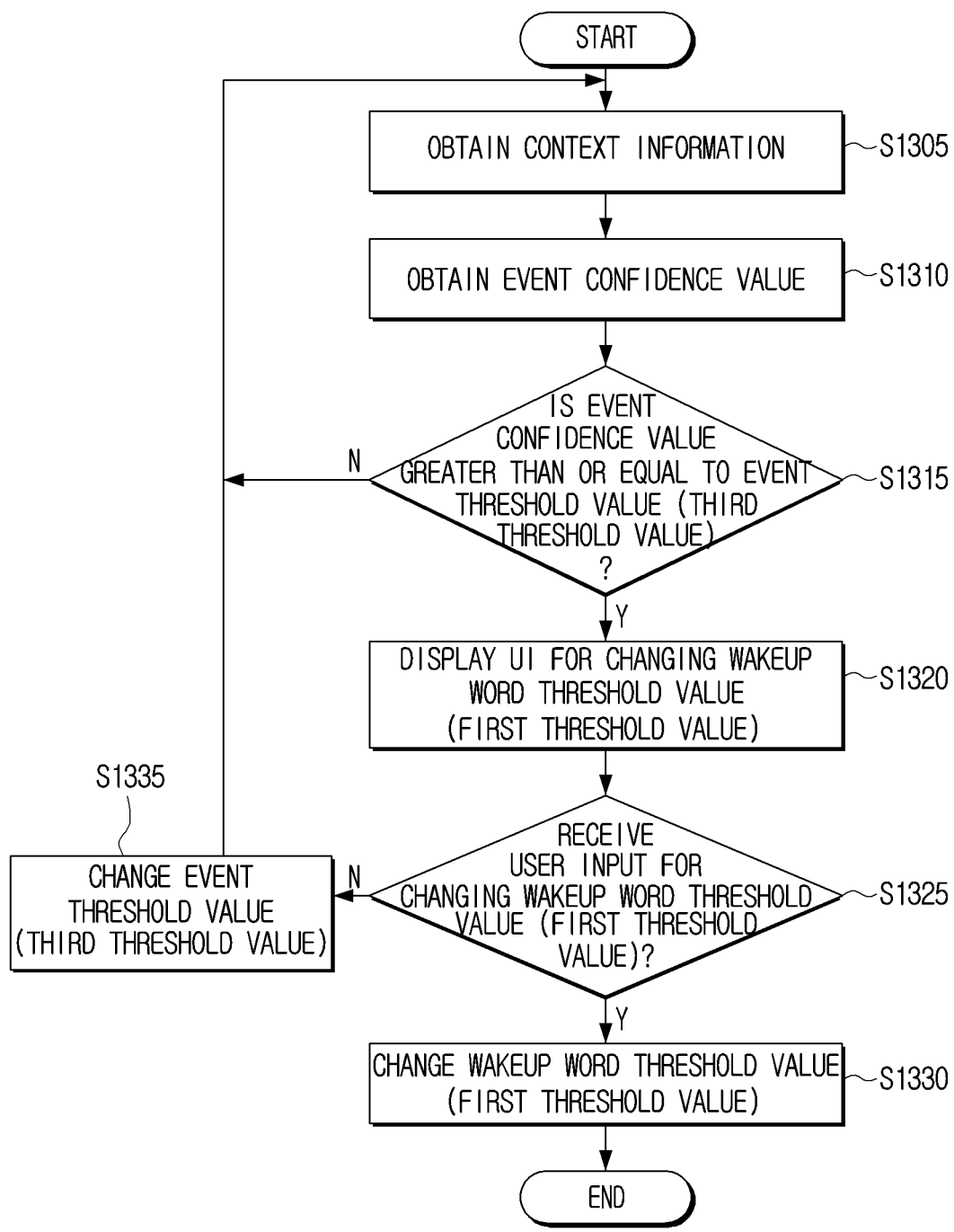
FIG. 13 is a diagram illustrating an operation of an electronic apparatus changing an event threshold value (third threshold value)

FIG. 13 is a diagram illustrating an operation of an electronic apparatus changing an event threshold value (third threshold value).

Referring to FIG. 13, operations S1305, S1310, and S1315 of FIG. 13 may correspond to operations S1205, S1210, and S1215 of FIG. 12. Accordingly, redundant descriptions thereof will be omitted.

Based on the event confidence value being greater than or equal to the event threshold value (third threshold value) (S1315—Y), the electronic apparatus 100 may be configured to display the UI for changing the wakeup word threshold value (first threshold value) (S1320).

Then, the electronic apparatus 100 may be configured to identify if the user input for changing the wakeup word threshold value (first threshold value) is received (S1325). Based on the user input for changing the wakeup word threshold value (first threshold value) being received (S1325—Y), the electronic apparatus 100 may be configured to change the wakeup word threshold value (first threshold value) (S1330).

Based on the user input for changing the wakeup word threshold value (first threshold value) not being received (S1325—N), the electronic apparatus 100 may be configured to change the event threshold value (third threshold value) (S1335). Here, the user input for changing the wakeup word threshold value (first threshold value) not being received may refer to the user input for maintaining the wakeup word threshold value (first threshold value) being received.

The operation for changing the event threshold value (third threshold value) may refer to increasing the event threshold value. The user having selected to not change the wakeup word threshold value (first threshold value) in operation S1325 may be determined as the current context not corresponding to the pre-determined event. For example, the electronic apparatus 100 may have displayed the UI for changing the wakeup word threshold value (first threshold value) by determining that the user is watching a movie, but the user may not have accepted. This may mean that the current context is not watching a movie. Accordingly, the electronic apparatus 100 may increase the event threshold value (third threshold value) and more strictly determine whether the pre-determined event has occurred.

According to an embodiment, the electronic apparatus 100 may be configured to delete the pre-determined event which corresponds to the event confidence value obtained in operation S1310.

FIG. 14 is a diagram illustrating event information.

Referring to a table 1405 in FIG. 14, the event information may include a plurality of pre-determined events. Further, the plurality of pre-determined events may include at least one from among information related with whether an event type, an event subject, an event confidence value condition, or a wakeup word threshold value (first threshold value) is to be changed.

The event type may be distinguished to at least one from among a location, time, or an operation. The location may refer to a place where an event is identified as occurring, time may refer to a time at which an event is identified as occurring, and the operation may refer to an operation in which an event is identified as occurring.

Here, the event subject may refer to a subject to be determined by the pre-determined event.

The event confidence value condition may refer to a condition related to a reference value for identifying the pre-determined event as occurring. Here, the reference value may refer to the event threshold value (third threshold value). The event confidence value may refer to a probability value of which the currently identified context is to correspond to the event. Accordingly, it may mean that the likelihood of the current context corresponding with the event subject may be great so long as the event confidence is high. Here, numbers such as 0.6, 0.8,- and 1 may refer to the event threshold value (third threshold value). The event confidence value condition may be between 0 and 1, and may mean that the likelihood of it being the corresponding event is high based on the event confidence value condition being closer to 1. For example, based on context of the electronic apparatus 100 having the confidence value of 0.87 which corresponds to the event subject (theater), it may mean that the likelihood of the context being a theater is 0.87.

In an example, a first event from among the plurality of pre-determined events may be such that the event type is a location, the event subject is a theater, the event confidence value condition is greater than or equal to 0.6, and whether to change the wakeup word threshold value (first threshold value) is increase.

In another example, a second event from among the plurality of pre-determined events may be such that the event type is a location, the event subject is home, the event confidence value condition is greater than or equal to 0.8, and whether to change the wakeup word threshold value (first threshold value) is decrease.

In still another example, a third event from among the plurality of pre-determined events may be such that the event type is a location, the event subject is a meeting room, the event confidence value condition is greater than or equal to 0.6, and whether to change the wakeup word threshold value (first threshold value) is increase.

In still another example, a fourth event from among the plurality of pre-determined events may be such that the event type is time, the event subject is '2021-01-15 15:30~2021-01-15 17:30,' the event confidence value condition is 1, and whether to change the wakeup word threshold value (first threshold value) is increase. Here, the reason that the confidence value condition is 1 is because condition satisfaction may be determined with only whether the time has arrived. For example, the event confidence may be 1 if the time '2021-01-15 15:30~2021-01-15 17:30' has arrived, and the event confidence value may be 0 if the time '2021-01-15 15:30~2021-01-15 17:30' has not arrived.

In still another example, a fifth event from among the plurality of pre-determined events may be such that the event type is time, the event subject is 'daily 00:00 daily 08:00,' the event confidence value condition is 1, and whether to change the wakeup word threshold value (first threshold value) is increase.

In still another example, a sixth event from among the plurality of pre-determined events may be such that the event type is an operation, the event subject is 'watching a movie,' the event confidence value condition is greater than or equal to 0.6, and whether to change the wakeup word threshold value (first threshold value) is increase.

In still another example, a seventh event from among the plurality of pre-determined events may be such that the event type is an operation, the event subject is 'on the phone,' the event confidence value condition is greater than or equal to 0.6, and whether to change the wakeup word threshold value (first threshold value) is increase. Here, in order to determine if 'on the phone,' the electronic apparatus 100 may be configured to use application execution information from among the context information. For example, based on the current phone call app being executed, the electronic apparatus 100 may be configured to identify the context as 'on the phone.'

The electronic apparatus 100 may be configured to store all seven events disclosed in the table 1405 of FIG. 14 in the memory 120. Then, based on only one event from among the seven events being identified, the wakeup word threshold value (first threshold value) may be changed.

Although seven pre-determined events have been described as being stored in the memory 120 in FIG. 14, events less than the seven pre-determined events may be stored, and events more than the seven pre-determined events may be stored.

Figure 15:
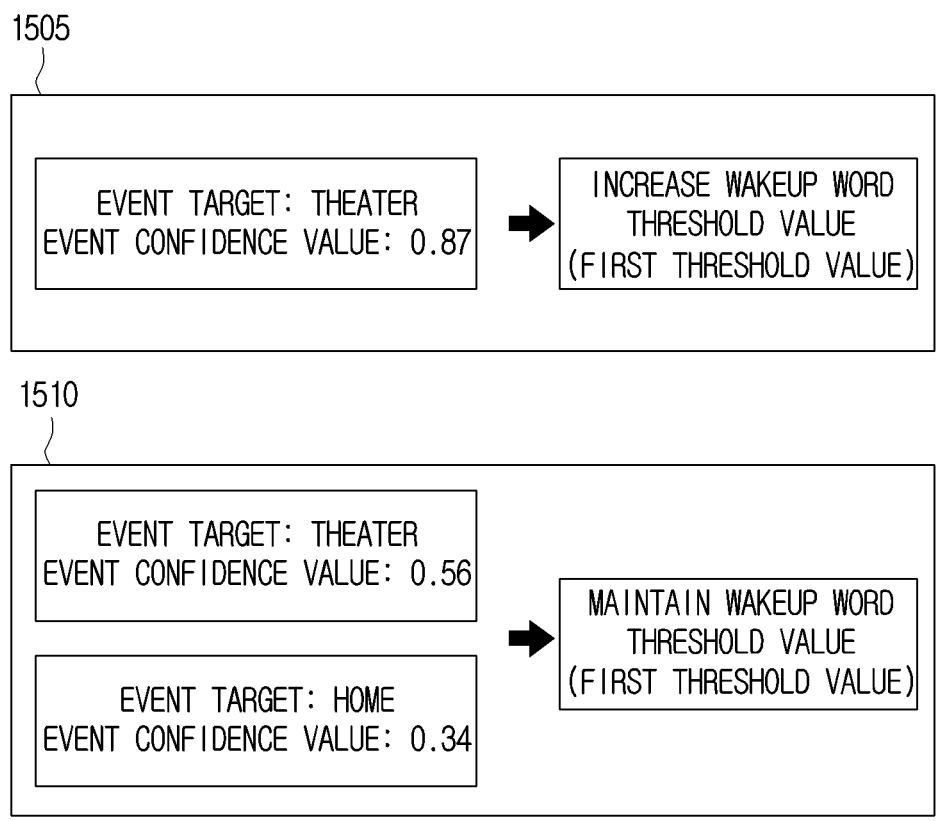
FIG. 15 is a diagram illustrating a first threshold value change result in a context according to various embodiments.

FIG. 15 is a diagram illustrating a first threshold value change result in a context according to various embodiments.

Here, it may be assumed that the seven pre-determined events included in table 1405 of FIG. 14 are stored in the electronic apparatus 100.

According to an embodiment 1505 of FIG. 15, the electronic apparatus 100 may be configured to identify that the current event target is theater and the event confidence value is 0.87 based on the context information. Here, the event confidence value condition of the event target which corresponds to theater may be greater than or equal to 0.6. Accordingly, because the obtained confidence value (0.87) is greater than or equal to the event threshold value (third threshold value, 0.6), the electronic apparatus 100 may be configured to identify as the pre-determined event as having occurred. Then, the electronic apparatus 100 may be configured to change the wakeup word threshold value (first threshold value).

According to another embodiment 1510 of FIG. 15, the electronic apparatus 100 may be configured to identify that the event confidence value which corresponds to the current theater (event target) based on the context information is 0.56 and the event confidence value which corresponds to home (event target) is 0.34. Here, the event confidence value condition which corresponds to theater may be greater than or equal to 0.6, and the event confidence value condition which corresponds to home may be greater than or equal to 0.8. Accordingly, because the obtained respective event confidence values (0.56, 0.34) are less than the respective event threshold values (third threshold value, 0.6, 0.8), the electronic apparatus 100 may be configured to identify that the pre-determined event has not occurred. Then, the electronic apparatus 100 may be configured to maintain the wakeup word threshold value (first threshold value).

The reason the number of the event target which is identified in another embodiment 1510 different from an embodiment 1505 is different is because of the operation which excludes the event target having an event confidence value which is too low. For example, the electronic apparatus 100 may be configured to obtain seven event confidence values which correspond to seven event subjects respectively of FIG. 14. Then, the electronic apparatus 100 may be configured to identify the event target which corresponds to the event confidence value over 0.3 from among the seven event confidence values as corresponding to the current context situation. Accordingly, in an embodiment 1505, there may be one event target with the event confidence value of over 0.3, and in another embodiment 1510, there may be two event targets with the event confidence value of over 0.3.

Figure 16:
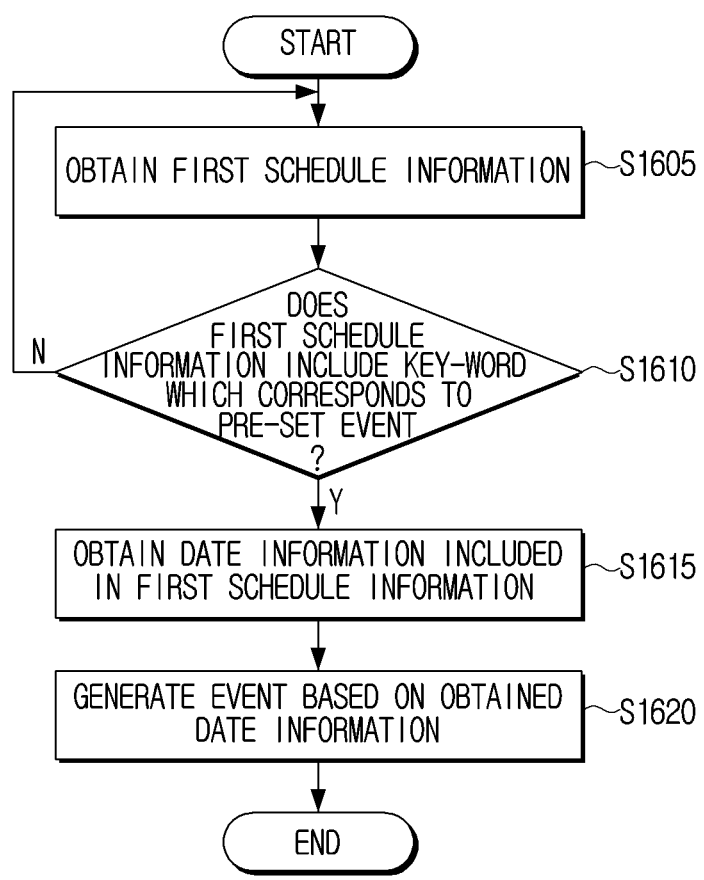
FIG. 16 is a flowchart illustrating an operation of an electronic apparatus storing a pre-determined event based on schedule information.

FIG. 16 is a flowchart illustrating an operation of an electronic apparatus storing a pre-determined event based on schedule information.

Referring to FIG. 16, the electronic apparatus 100 may be configured to store schedule information in the memory 120. Here, the schedule information may be newly updated by the user input. The schedule which is newly updated will be described as a first schedule information.

The electronic apparatus 100 may be configured to obtain first schedule information (S1605). Then, the electronic apparatus 100 may be configured to identify whether the first schedule information includes a key-word which corresponds to the pre-determined event (S1610). The key-word which corresponds to the pre-determined event may refer to text information for checking if the information included in the schedule information is related to the pre-determined event. For example, in the table 1405 of FIG. 14, the key-word which corresponds to the pre-determined event may mean theater, home, meeting room, specific time (00:00~08:00), phone, and the like.

Here, based on the first schedule information being identified as not including the key-word which corresponds to the pre-determined event (S1610—N), the electronic apparatus 100 may be configured to repeatedly obtain the first schedule information. Based on the first schedule information being identified as including the key-word which corresponds to the pre-determined event (S1610—Y), the electronic apparatus 100 may be configured to obtain date information included in the first schedule information (S1615).

Then, the electronic apparatus 100 may be configured to generate an event based on the obtained date information (S1620). For example, the wakeup word threshold value (first threshold value) may be set to increase when watching a movie in the pre-determined event. This is to make recognition of the wakeup word difficult. Here, the user may register a new schedule and the new schedule may be watching a movie with a friend on Jan. 20, 2021, from 19:00 to 21:00. The electronic apparatus 100 may determine the "movie" included in the new schedule as the same as with the key-word (movie) which corresponds to the pre-determined event. Then, the event which increases the wakeup word threshold value (first threshold value) in the date information (Jan. 20, 2021, from 19:00 to 21:00) included in the new schedule information may be newly generated and stored.

The key-word may include numbers in addition to text. For example, a specific time slot (00:00 to 08:00) itself may be the key-word.

FIG. 17 is a diagram illustrating an operation of an electronic apparatus storing some schedules from among a plurality of schedules as a pre-determined event.

Referring to a table 1705 of FIG. 17, it may be assumed that the electronic apparatus 100 received #01, #02 and #03 schedule information. The #01 schedule information may be 'watching a movie' at 'Seoul Gangnam Station' on '2021-01-20, 19:00~21:00,' #02 schedule information may be 'meeting a friend' at 'Seoul Gangnam Station' on '2021-01-22, 20:00~21:00,' and #03 schedule information may be 'work meeting' at 'company' on '2021-01-24, 15:00~16:00.'

The electronic apparatus 100 may be configured to identify whether the information included in the received schedule information (#01, #02 and #03) is a match with the key-word which corresponds to the pre-determined event.

Here, it may be assumed that the key-words which correspond to the pre-determined events are 'movie' and 'meeting.' The electronic apparatus 100 may be configured to identify that #01 schedule and #03 schedule include the key-words which correspond to the pre-determined events. Accordingly, the electronic apparatus 100 may be configured to store #01 schedule and #03 schedule as the pre-determined events.

Specifically, the electronic apparatus 100 may be configured to obtain date information ('2021-01-20, 19:00~21:00,' '2021-01-24, 15:00~16:00') from the schedule information (#01, #03) which is identified to include the key-words that correspond to the pre-determined events. Then, an event which increases the wakeup word threshold value (first threshold value) in the obtained date information ('2021-01-20, 19:00~21:00,' '2021-01-24, 15:00~16:00') may be generated. Then, the electronic apparatus 100 may be configured to store the generated event in the memory 120 as the pre-determined event.

Figure 18:
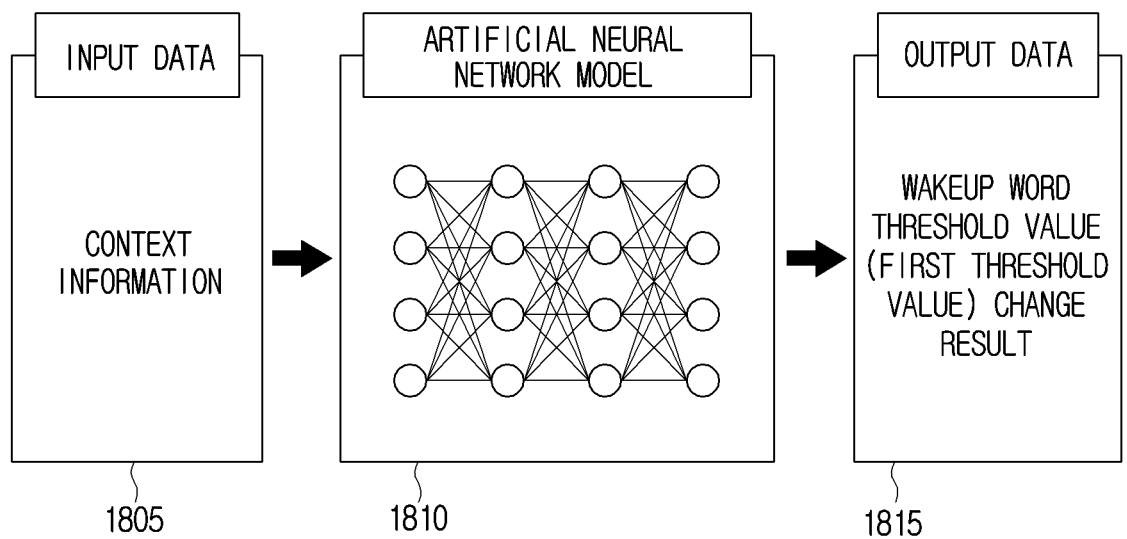
FIG. 18 is a diagram illustrating an operation of training an artificial neural network model according to an embodiment.

FIG. 18 is a diagram illustrating an operation of training an artificial neural network model according to an embodiment.

Referring to FIG. 18, the electronic apparatus 100 may be configured to use an artificial neural network model 1810 to identify whether to change the wakeup word threshold value (first threshold value). Here, the artificial neural network model 1810 may be a model trained based on input data 1805 and output data 1815.

The input data 1805 may refer to context information. Here, the context information may refer to the user information 401, the device information 402, and the sensing information 403 of FIG. 4. The output data 1815 may refer to a result on whether to change the wakeup word threshold value (first threshold value).

The artificial neural network model 1810 may be configured to learn a determination algorithm on whether to change the wakeup word threshold value (first threshold value) based on a plurality of context information and a plurality of results.

Figure 19:
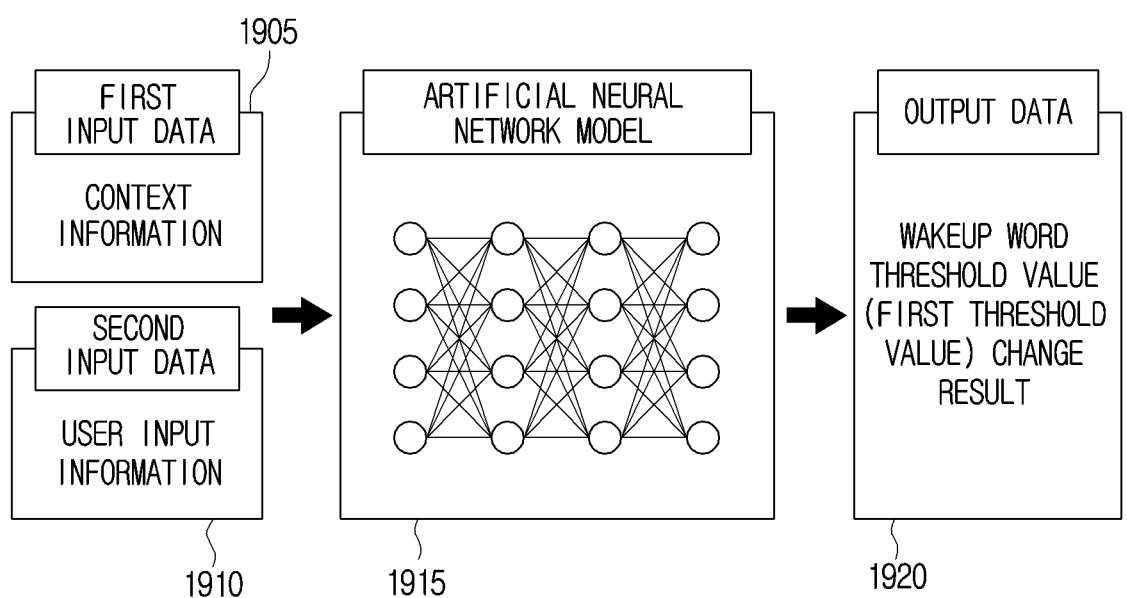
FIG. 19 is a diagram illustrating an operation of training an artificial neural network model according to another embodiment.

FIG. 19 is a diagram illustrating an operation of training an artificial neural network model according to another embodiment.

Referring to FIG. 19, the electronic apparatus 100 may be configured to use an artificial neural network model 1915 to identify whether to change the wakeup word threshold value (first threshold value). Here, the artificial neural network model 1915 may be a model trained based on first input data 1905, second input data 1910 and output data 1920.

The first input data 1905 may refer to context information. Here, the context information may mean the user information 401, the device information 402, and the sensing information 403 of FIG. 4.

The second input data 1910 may refer to information related to the user input which is selected through the UI for changing the wakeup word threshold value (first threshold value). For example, the second input data 1910 may be the user input which is obtained in operation S920 of FIG. 9.

The output data 1920 may refer to the result on whether to change the wakeup word threshold value (first threshold value).

The artificial neural network model 1915 may be configured to learn the determination algorithm on whether to change the wakeup word threshold value (first threshold value) based on the plurality of context information and the plurality of results.

Figure 20:
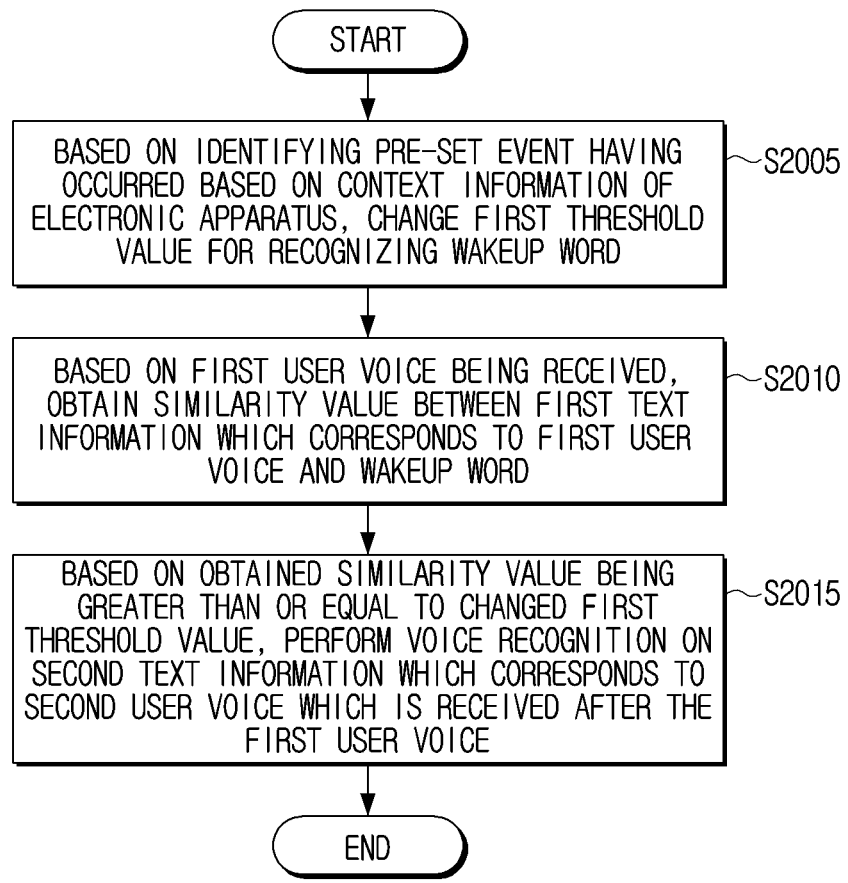
FIG. 20 is a flowchart illustrating a controlling method of an electronic apparatus according to an embodiment.

FIG. 20 is a flowchart illustrating a controlling method of an electronic apparatus according to an embodiment.

Referring to FIG. 20, a control method of the electronic apparatus 100 which stores the wakeup word according to an embodiment may include identifying, based on context information of the electronic apparatus 100, an occurrence of a pre-determined event (S2000), based on the occurrence of the pre-determined event, changing the first threshold value for recognizing the wakeup word (S2005), based on the first user voice being received, obtaining the similarity value between the first text information which corresponds to the first user voice and the wakeup word (S2010), and based on the obtained similarity value being greater than or equal to the changed first threshold value, performing voice recognition on the second text information which corresponds to the second user voice which is received after the first user voice (S2015).

The context information may include at least one from among the schedule information, the application execution information, the time information, the location information, the speed information, the acceleration information, the audio information, or the motion information.

The changing the first threshold value (S2015) includes based on the time information matching with the time information which corresponds to the pre-determined event, identifying as the pre-determined event having occurred, and based on the location information matching with the location information which corresponds to the pre-determined event, identifying as the pre-determined event having occurred and identifying the occurrence of the pre-determined event based on identifying that the time information matches the pre-determined time information and that the location information matches the pre-determined location information.

The control method may further include, based on the pre-determined event key-word being included in the schedule information, storing the schedule information as the pre-determined event, and the changing the first threshold value (S2015) may include, based on the time information matching with the time information which corresponds to the schedule information, identifying as the pre-determined event having occurred.

The changing the first threshold value (S2015) may include identifying the number of speakers uttering voices based on the audio information, and based on the number of identified speakers being greater than or equal to the second threshold value, identifying as the pre-determined event having occurred.

The first threshold value may be a value which is used for determining whether the wakeup word has been recognized.

The control method may further include obtaining at least one from among the speed information or the acceleration information based on sensing data obtained through the sensor 180 of the electronic apparatus 100, obtaining audio information based on a user voice obtained through the microphone 110 of the electronic apparatus 100, obtaining motion information based on an image obtained through the camera 190 of the electronic apparatus 100, and receiving the time information or the location information from an external server through the communication interface of the electronic apparatus 100.

The control method may further include displaying, based on the pre-determined event being identified as having occurred based on the context information, a user interface (UI) for changing the first threshold value, and the changing the first threshold value (S2015) may include changing, based on the user input changing the first threshold value being received through the displayed UI, the first threshold value based on the user input.

The control method may further include deleting, based on the user input maintaining the first threshold value being received through the displayed UI, the pre-determined event.

The changing the first threshold value (S2015) may include obtaining the event confidence value which corresponds to the pre-determined event based on the context information, and based on the obtained event confidence value being greater than or equal to the third threshold value, changing the first threshold value.

The control method of the electronic apparatus 100 as in FIG. 20 may be executed on the electronic apparatus 100 having the configurations of FIG. 2 or FIG. 3, and may also be executed on the electronic apparatus 100 having configurations in addition thereto.

The methods according to the various embodiments of the disclosure as described above may be implemented in an application form installable in electronic apparatuses of the related art.

In addition, the methods according to the various embodiments of the disclosure as described above may be implemented with only a software upgrade or a hardware upgrade with respect to the electronic apparatuses of the related art.

The various embodiments of the disclosure as described above may be performed through an embedded server provided in the electronic apparatus, or through at least one external server from among the electronic apparatus or the display apparatus.

According to an embodiment, the various embodiments described above may be implemented with software including instructions stored in a machine-readable storage media (e.g., computer). The machine may call an instruction stored in the storage medium, and as an apparatus capable of operating according to the called instruction, may include the electronic apparatus according to the above-mentioned embodiments. Based on the instruction being executed by the processor, the processor may directly or under the control of the processor perform a function corresponding to the instruction using different elements. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored and data temporarily being stored in the storage medium.

In addition, according to an embodiment, the method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In addition, respective elements (e.g., a module or a program) according to various embodiments may be comprised of a single entity or a plurality of entities, and some sub-elements from among the abovementioned sub-elements may be omitted or other sub-elements may be further included in the various embodiments. Alternatively or additionally, some elements (e.g., modules or programs) may be integrated into one entity to perform the same or similar functions performed by respective corresponding elements prior to integration. Operations performed by a module, program, or other element, in accordance with the various embodiments, may be performed sequentially, in parallel, repetitively, or in a heuristically manner, or at least some operations may be performed in a different order, omitted, or a different operation may be added.

The invention claimed is:

1. An electronic apparatus, comprising:
a microphone;
a memory configured to store a wakeup word; and
a processor configured to:
obtain context information including at least one from among schedule information, application execution information, time information, location information, speed information, acceleration information, audio information, or motion information,
identify, based on the context information of the electronic apparatus, an occurrence of a pre-determined event;
change, based on the occurrence of the pre-determined event, a first threshold value for recognizing the wakeup word;
obtain, based on a first voice input received via the microphone, a similarity value between first text information corresponding to the first voice input and the wakeup word; and
perform, based on the similarity value being greater than or equal to the changed first threshold value, a speech recognition function on second text information corresponding to a second voice input received via the microphone after the first voice input,
wherein the first threshold value is a value used to determine whether the wakeup word is recognized,
wherein the processor is further configured to:
identify that the time information matches pre-determined time information corresponding to the pre-determined event;
identify that the location information matches pre-determined location information corresponding to the pre-determined event; and
identify the occurrence of the pre-determined event based on identifying that the time information matches the pre-determined time information and that the location information matches the pre-determined location information.

2. The electronic apparatus of claim 1, wherein the processor is further configured to:
store, based on a pre-determined key-word being included in the schedule information, the schedule information as the pre-determined event; and
identify, based on the time information matching pre-determined time information corresponding to the schedule information, the occurrence of the pre-determined event.

3. The electronic apparatus of claim 1, wherein the processor is further configured to:
identify a number of speakers uttering voice inputs based on the audio information; and
identify, based on the number of speakers being greater than or equal to a second threshold value, the occurrence of the pre-determined event.

4. The electronic apparatus of claim 1, further comprising:
a sensor;
a camera; and
a communication interface,
wherein the processor is further configured to:
obtain at least one of the speed information or the acceleration information based on sensing data obtained via the sensor;
obtain the audio information based on a third user voice obtained via the microphone;
obtain the motion information based on an image obtained via the camera; and
receive the time information or the location information from an external server via the communication interface.

5. The electronic apparatus of claim 1, further comprising:
a display,
wherein the processor is further configured to:
control, based on the occurrence of the pre-determined event, the display to display a user interface (UI) to change the first threshold value; and
change, based on a user input for changing the first threshold value being received via the UI, the first threshold value based on the user input.

6. The electronic apparatus of claim 5, wherein the processor is further configured to:
delete, based on another user input for maintaining the first threshold value being received via the UI, the pre-determined event.

7. The electronic apparatus of claim 1, wherein the processor is further configured to:
obtain an event confidence value corresponding to the pre-determined event based on the context information; and
change, based on the event confidence value being greater than or equal to a third threshold value, the first threshold value.

8. A method of controlling an electronic apparatus configured to store a wakeup word, the method comprising:
obtaining context information including at least one from among schedule information, application execution information, time information, location information, speed information, acceleration information, audio information, or motion information;
identifying, based on the context information of the electronic apparatus, an occurrence of a pre-determined event;
changing, based on the occurrence of the pre-determined event, a first threshold value for recognizing the wakeup word;
obtaining, based on receiving a first voice input, a similarity value between first text information corresponding to the first voice input and the wakeup word; and
performing, based on the similarity value being greater than or equal to the changed first threshold value, a speech recognition function on second text information corresponding to a second voice input received after the first voice input,
wherein the first threshold value is a value used to determine whether the wakeup word is recognized, and wherein the changing the first threshold value comprises:
- identifying that the time information matches pre-determined time information corresponding to the pre-determined event;
- identifying that the location information matches pre-determined location information corresponding to the pre-determined event; and
- identifying the occurrence of the pre-determined event based on identifying that the time information matches the pre-determined time information and that the location information matches the pre-determined location information.

9. The method of claim 8, further comprising:
storing, based on a pre-determined event key-word being included in the schedule information, the schedule information as the pre-determined event; and
identifying, based on the time information matching pre-determined time information corresponding to the schedule information, the occurrence of the pre-determined event.

10. The method of claim 8, further comprising:
identifying a number of speakers uttering voice inputs based on the audio information; and
identifying, based on the number of speakers being greater than or equal to a second threshold value, the occurrence of the pre-determined event.

* * * * *